(12) United States Patent
Baxter et al.

(10) Patent No.: US 11,724,318 B2
(45) Date of Patent: Aug. 15, 2023

(54) BIT FOR REMOVING A PLUG FROM A BRANCH CONDUIT

(71) Applicant: INA Acquisition Corp., Chesterfield, MO (US)

(72) Inventors: Rick Baxter, St. Louis, MO (US); Steven McKeefrey, Hauppauge, NY (US); Hermann Herrlich, Hauppauge, NY (US); Kole Kottmeier, Hauppauge, NY (US)

(73) Assignee: INA Acquisition Corp., Wilmington, DE (US)

( * ) Notice: Subject to any disclaimer, the term of this patent is extended or adjusted under 35 U.S.C. 154(b) by 102 days.

(21) Appl. No.: 17/451,118

(22) Filed: Oct. 15, 2021

(65) Prior Publication Data

US 2022/0118525 A1  Apr. 21, 2022

Related U.S. Application Data

(60) Provisional application No. 63/092,153, filed on Oct. 15, 2020.

(51) Int. Cl.
*B23B 27/16* (2006.01)
*F16L 41/04* (2006.01)
*F16L 11/04* (2006.01)

(52) U.S. Cl.
CPC .............. *B23B 27/16* (2013.01); *F16L 11/04* (2013.01)

(58) Field of Classification Search
CPC ................. B23B 27/016; F16L 41/04
See application file for complete search history.

(56) References Cited

U.S. PATENT DOCUMENTS

| 5,150,056 | A | 9/1992 | Wilcock |
| 5,333,649 | A | 8/1994 | Shimokawa et al. |
| 6,125,950 | A * | 10/2000 | Osborne ................. E21B 7/065 |
| | | | 175/398 |
| 8,015,695 | B2 | 9/2011 | Polivka et al. |
| 9,494,270 | B2 | 11/2016 | Cain et al. |
| 2009/0289451 | A1 | 11/2009 | Oxner et al. |

(Continued)

FOREIGN PATENT DOCUMENTS

WO    2010115290 A1    10/2010

OTHER PUBLICATIONS

PCT International Search Report and Written Opinion for PCT Application No. PCT/US19/63782, dated Mar. 4, 2020, 19 pages, United States.

*Primary Examiner* — Kevin R Barss
(74) *Attorney, Agent, or Firm* — Stinson LLP

(57) ABSTRACT

In one aspect, a bit for removing a plug from a branch conduit extending from a main pipe has a boring head at a distal end portion of a shaft configured to bore a pilot hole in the plug. A catch on the shaft is configured to pass through the pilot hole and then engage the plug after the pilot hole is bored for pushing the plug proximally. A burr proximal of the boring head is configured to remove a portion of the plug to separate a removable section from a durable section of the plug. In a method of restoring fluid communication between a main pipe and a branch conduit, the bit bores a pilot hole with the boring head, separates the removable section from the durable section with the burr, and then with the catch, withdraws the removable section only.

20 Claims, 33 Drawing Sheets

(56) References Cited

U.S. PATENT DOCUMENTS

| | | | |
|---|---|---|---|
| 2011/0164936 A1* | 7/2011 | Okumura | B23B 27/143 |
| | | | 408/1 BD |
| 2011/0232793 A1 | 9/2011 | Polivka et al. | |
| 2012/0103514 A1 | 5/2012 | Kamiyama et al. | |
| 2013/0233428 A1 | 12/2013 | Cain et al. | |
| 2014/0161545 A1* | 6/2014 | Inagaki | B23C 5/06 |
| | | | 407/42 |
| 2014/0314509 A1* | 10/2014 | Yamamichi | B23C 5/06 |
| | | | 407/100 |
| 2019/0375024 A1* | 12/2019 | Iwasaki | B23B 27/141 |
| 2021/0016363 A1* | 1/2021 | Ando | B23B 1/00 |

* cited by examiner

US 11,724,318 B2

BIT FOR REMOVING A PLUG FROM A BRANCH CONDUIT

RELATED CASES

This application claims priority to U.S. Provisional Patent Application Ser. No. 63/092,153, filed Oct. 15, 2020, which is hereby incorporated by reference in its entirety for all purposes.

FIELD

The present disclosure generally relates to methods, systems, and apparatuses for use in rehabilitating main pipes that are connected to branch conduits. More specifically, aspects of the disclosure pertain to a system, method, robot, and tool for removing a portion of a plug from a branch conduit after a rehabilitation process is carried out inside the main pipe.

BACKGROUND

The use of linings to repair pipes is a well-known process that has many benefits, including relatively low cost and minimal disruption to surroundings. However, the treatment of lateral connections within the pipe presents certain challenges. In the first instance, it is desirable to plug the lateral connections so that resin from the lining does not enter the lateral. However, it is necessary to remove any plugs after lining is complete. Moreover, the lining covers over the lateral openings, so finding the lateral connections after lining can be challenging.

SUMMARY

In one aspect, a bit for removing a plug from a branch conduit extending from a main pipe comprises a shaft having a rotational axis and a distal end portion and a proximal end portion spaced apart from the distal end portion in a proximal direction along the rotational axis. The shaft is configured to attach to a robot capable of movement within the main pipe. A boring head is at the distal end portion of the shaft. The boring head is configured to bore a pilot hole from a proximal end portion of the plug toward a distal end portion of the plug. A catch on the shaft is configured to pass through the pilot hole as the boring head bores the pilot hole. The catch is configured to engage the plug after the pilot hole is bored such that the catch can push the plug in the proximal direction when the bit is moved in the proximal direction.

In another aspect, a bit for removing a plug from a branch conduit extending from a main pipe comprises a shaft having a rotational axis and a distal end portion and a proximal end portion spaced apart from the distal end portion in a proximal direction along the rotational axis. The shaft is configured to attach to a robot capable of moving within the main pipe. A boring head is at the distal end portion of the shaft. The boring head is configured to bore a pilot hole from a proximal end portion of the plug toward a distal end portion of the plug. A burr is on the shaft at a location spaced apart from the boring head in the proximal direction. The burr is configured to remove a portion of the plug to separate a removable section of the plug from a durable section of the plug.

In another aspect, a method of restoring fluid communication between a main pipe and a branch conduit after the main pipe has been plugged by a plug comprises rotating a plug removal bit. The plug removal bit is advanced outward along an axis of the branch conduit while rotating the plug removal bit to (i) bore a hole that extends from a proximal end portion through a distal end portion of the plug along the axis and (ii) separate a removable section of the plug that includes the pilot hole from a durable section of the plug. The plug removal bit is withdrawn inward along the axis of the branch conduit, whereby the plug removal bit engages the removable section of the plug and moves the removable section together with the plug removal bit to remove the removable section of the plug from the branch conduit while leaving the durable section of the plug in place.

Other aspects and features will also be understood from the following disclosure.

BRIEF DESCRIPTION OF THE DRAWINGS

Corresponding parts indicate corresponding reference characters throughout the drawings.

DETAILED DESCRIPTION

Co-assigned U.S. Patent Application Publication No. 2020/0173599 pertains to various methods, systems, and apparatuses for use in rehabilitating main pipes that are connected to a branch conduit. U.S. Patent Application Publication No. 2020/0173599 is hereby incorporated by reference and constitutes part of the disclosure of the present application. As explained more fully below, the present disclosure pertains to methods, systems, and apparatuses of the type disclosed in U.S. Patent Application Publication No. 2020/0173599. The inventors have recognized ways to improve upon the pipe rehabilitation techniques disclosed in U.S. Patent Application Publication No. 2020/0173599. In particular, the inventors have devised an alternative way of plugging a branch conduit before it is lined with a liner and then removing the plug after the pipe lining process is complete so as to restore fluid communication between the main pipe and the branch conduit. As explained in U.S. Patent Application Publication No. 2020/0173599, a robot may be configured to move along a main pipe and install plugs into each branch conduit that is connected to the main pipe. After the plugs are installed, the main pipe may be lined with a pipe liner, and then the robot can be used with a plug removal tool to remove a removable section of the plug and the liner while leaving a durable section of the plug in place to be used as a locating beacon during later robotic operations performed within the pipe. As explained in Section VI, the plug removal tool comprises a drill and a rotatable drill bit that is configured to bore through a removable middle portion of the plug without contacting a durable flange portion of the plug. Aspects of the present disclosure pertain to a bit that may be used as a replacement for the rotatable drill bit disclosed in U.S. Patent Application Publication No. 2020/0173599. In other words, the drill bit and methods of use described below may be employed in combination with the robot, plug removal tool, and associated methods of the types disclosed in U.S. Patent Application Publication No. 2020/0173599.

Figure 1:
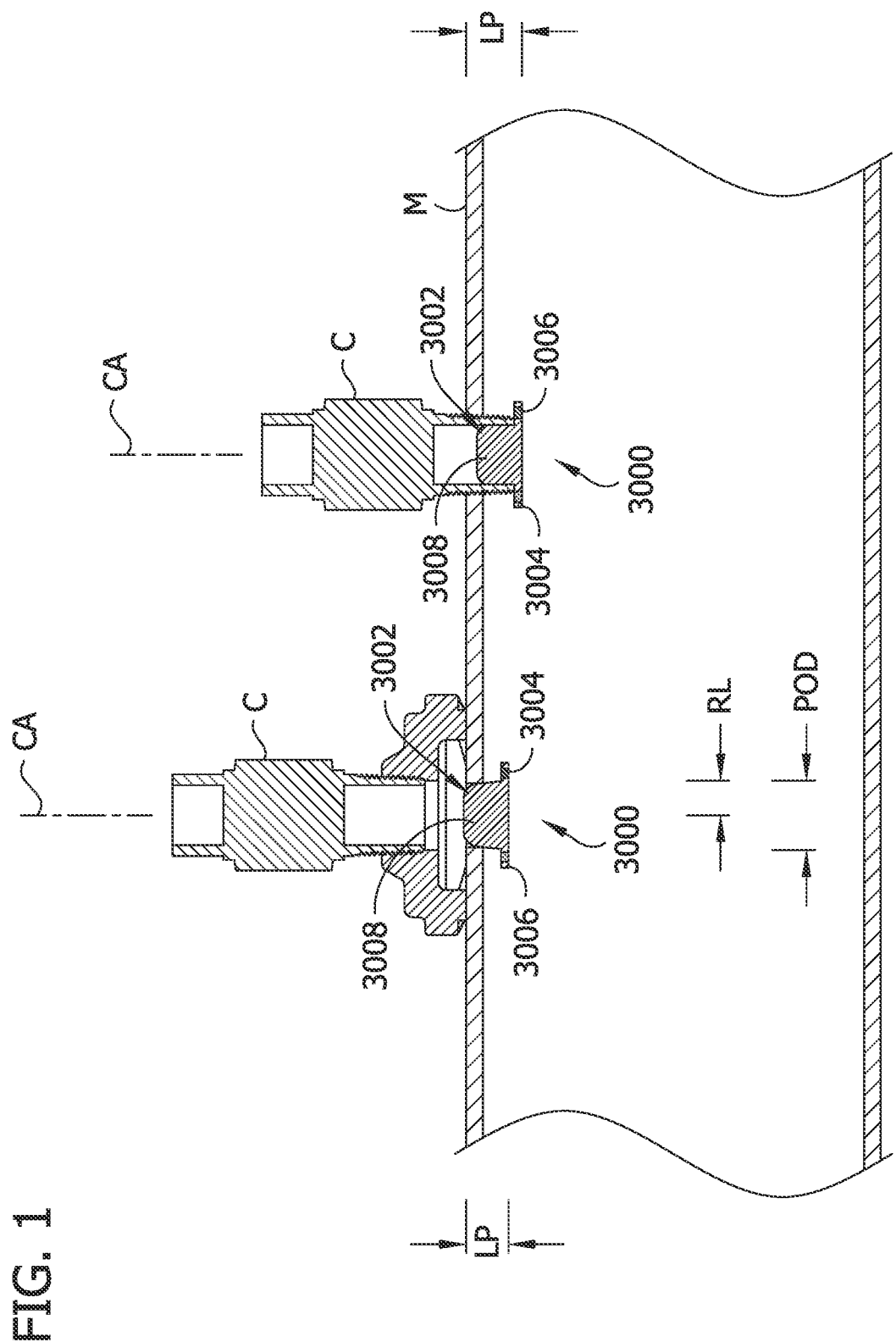
FIG. 1 is a longitudinal section of a pipe system including a main pipe and first and second corporation stops sealed by respective plugs.
Figure 2:
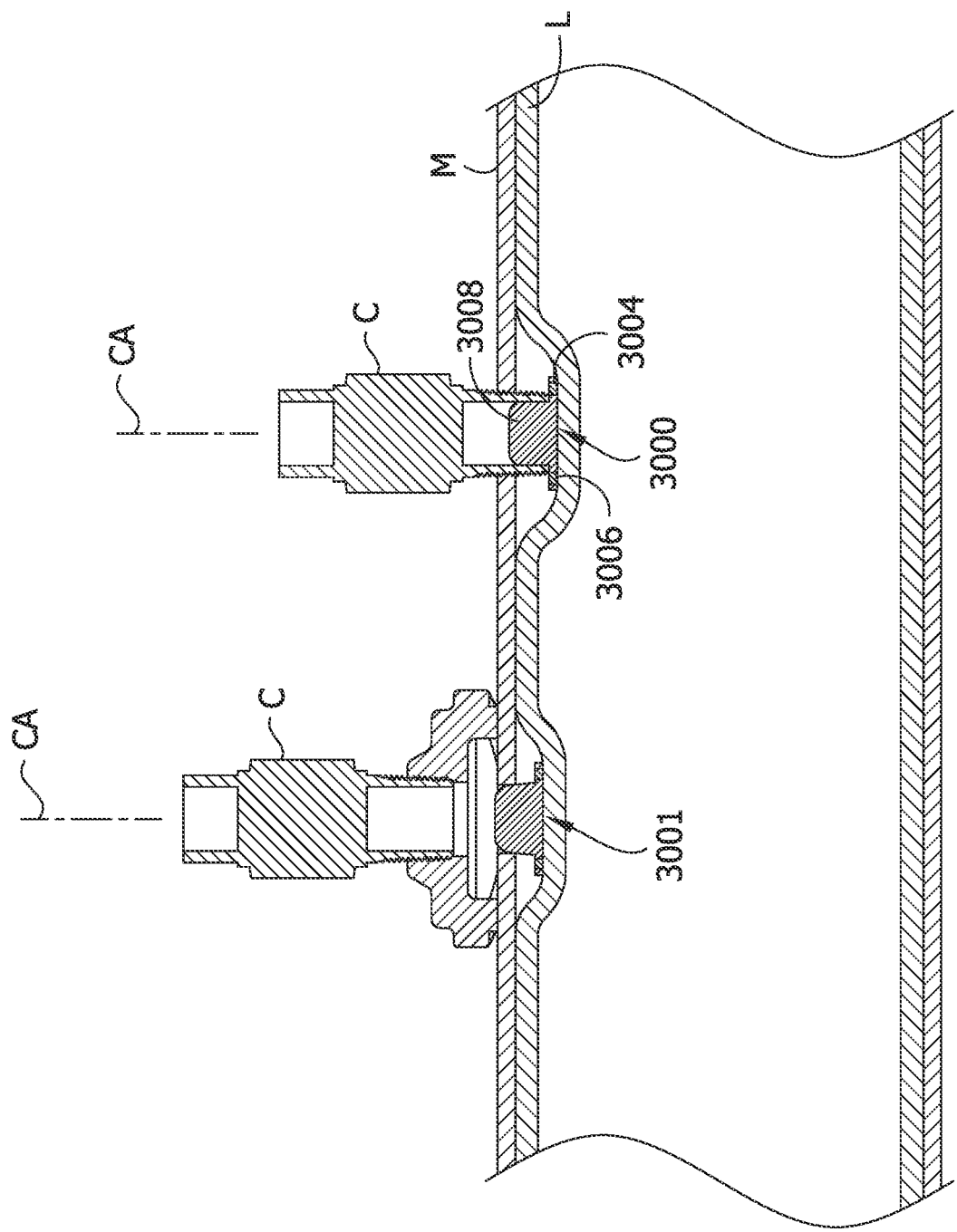
FIG. 2 is a longitudinal section similar to FIG. 1, showing the main pipe lined with a pipe liner.
Figure 3:
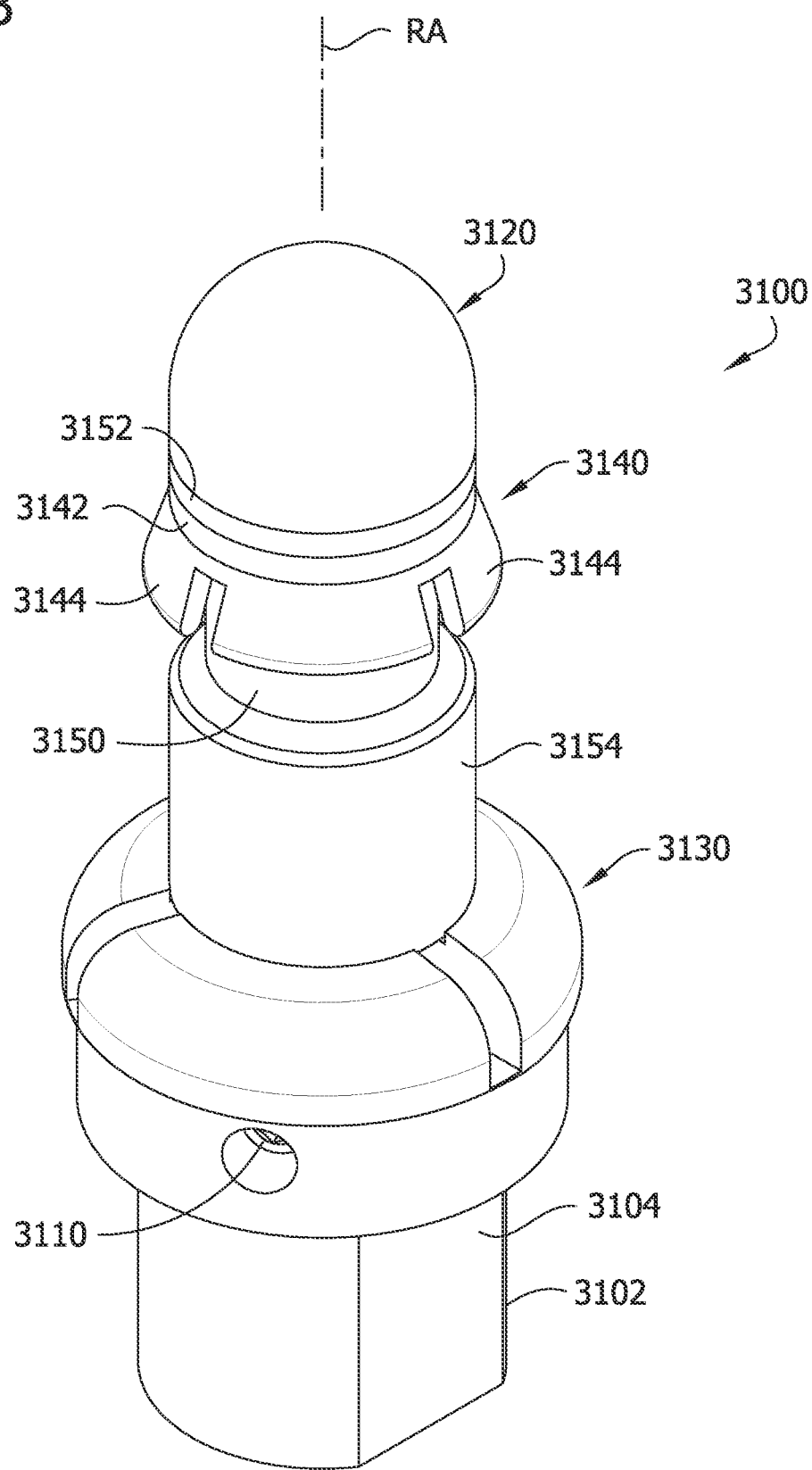
FIG. 3 is a perspective of a bit for removing a plug from a corporation stop.
Figure 4:
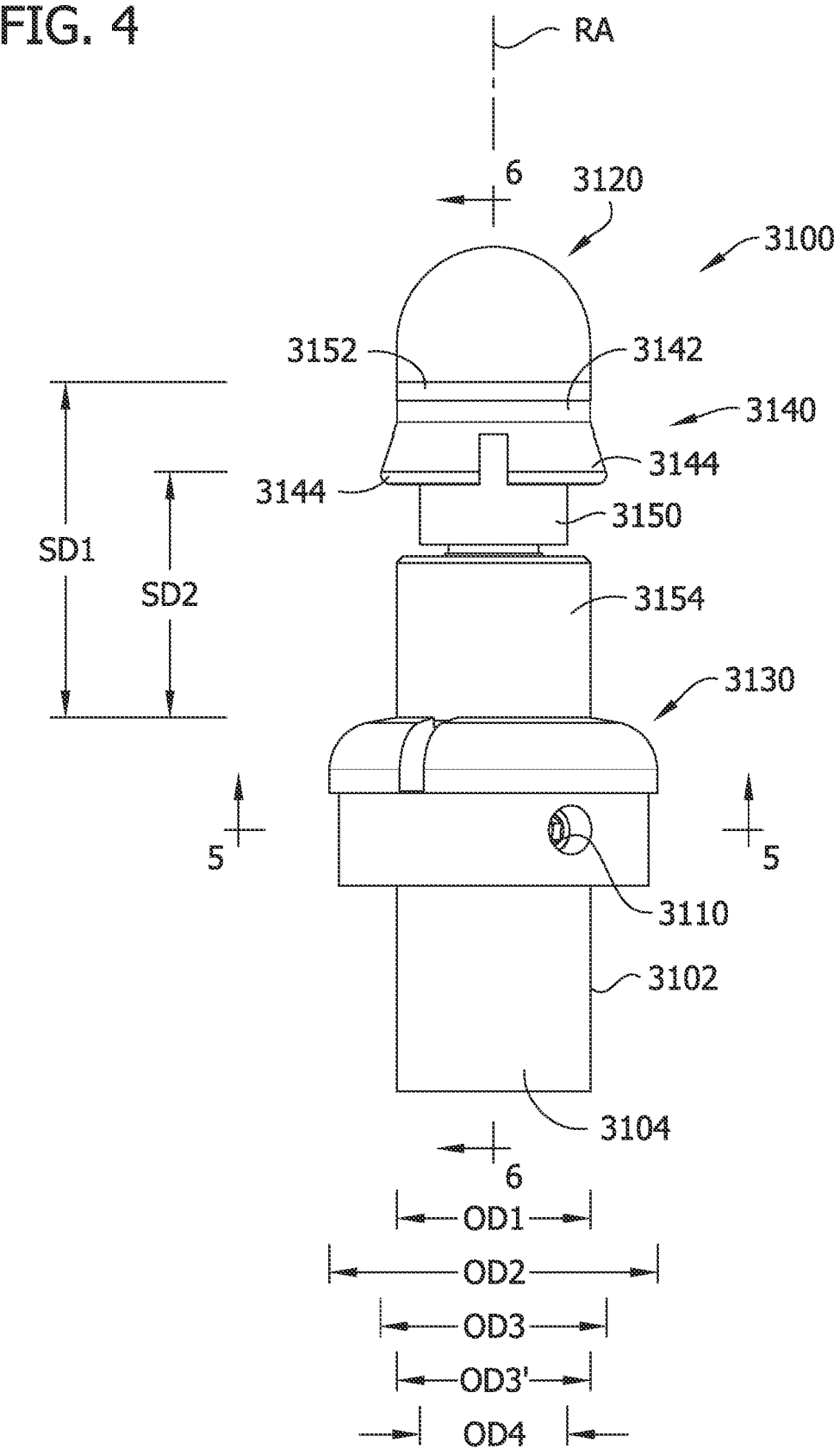
FIG. 4 is an elevation of the bit.

Referring to FIGS. 1 and 2, before turning to the details of an exemplary embodiment of a plug removal bit, an example of the environment and the plugs for which such a bit may be used will first be briefly described. In FIG. 1, first and second plugs 3000 have been inserted (e.g., using techniques described in U.S. Patent Application Publication No. 2020/0173599) into first and second corporation stops C (broadly, branch conduits) connected to a main pipe M. The plugs 3000 differ from the plugs disclosed in Section III of U.S. Patent Application Publication No. 2020/0173599. In particular, the illustrated plugs 3000 have a simpler construction. Each plug 3000 comprises a solid plug body 3002 formed from a resiliently compressible seal material such as a rubber, a cork, or the like. Each plug body 3002 has a length LP extending along the axis CA of the corporation stop C from a proximal end portion and to a distal end portion. The proximal end portion of the plug body 3002 includes a flange section 3004, which is configured to form a durable section of the plug that functions similar to the durable plug section described in U.S. Patent Application Publication No. 2020/0173599. Thus, in the illustrated embodiment, a plurality of locating elements 3006 are embedded in the durable flange section 3004. In the illustrated embodiment, each of the locating elements 3006 is radially spaced from the axis CA by a minimum spacing distance RL. A central portion of the plug body 3002 forms a removable stopper section 3008 configured to be sealingly received as a bung-type stopper in the interior of the corporation stop C. Thus, the removable stopper section 3008 of the plug body 3002 has an outer dimension POD that is about the same as or slightly larger than an inner dimension of the corporation stop C. As explained more fully below, the removable section 3008 is configured to be separated from the durable section 3004 and removed after the main pipe M is lined with a pipe liner L shown in FIG. 2.

Figure 5:
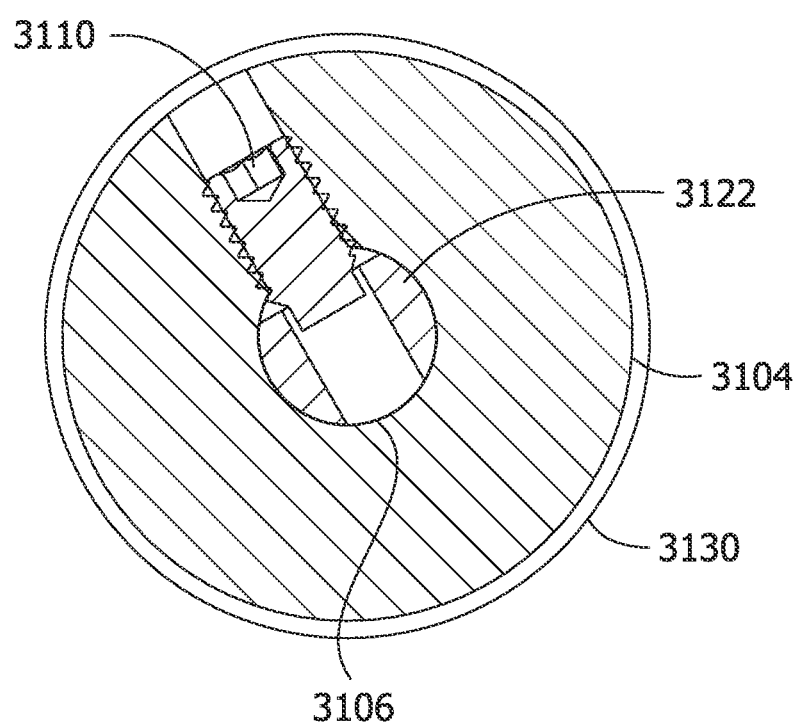
FIG. 5 is a section taken in the plane of line 5-5 of FIG. 4, but reduced in scale.
Figure 6:
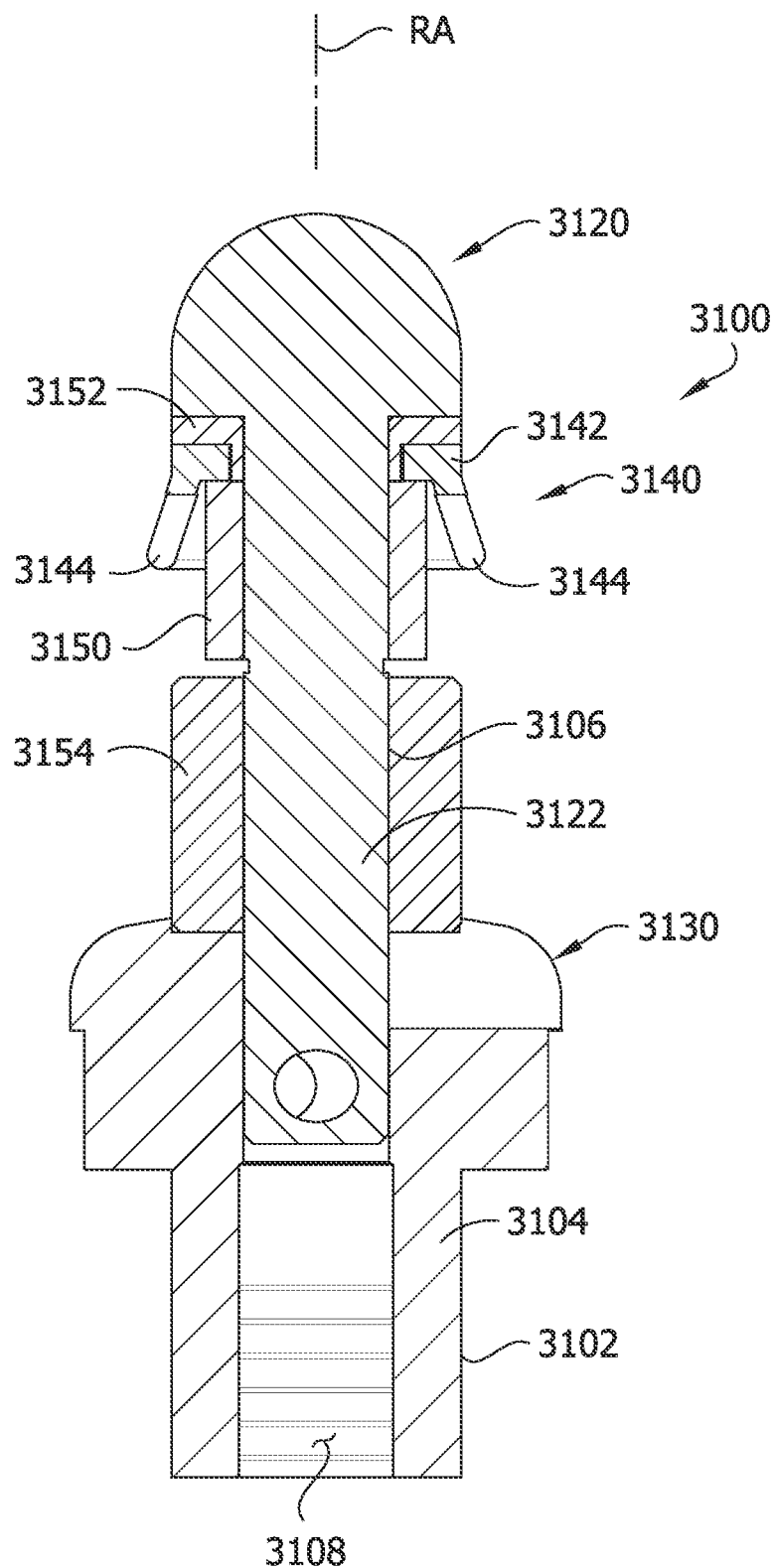
FIG. 6 is a longitudinal section of the bit.
Figure 7:
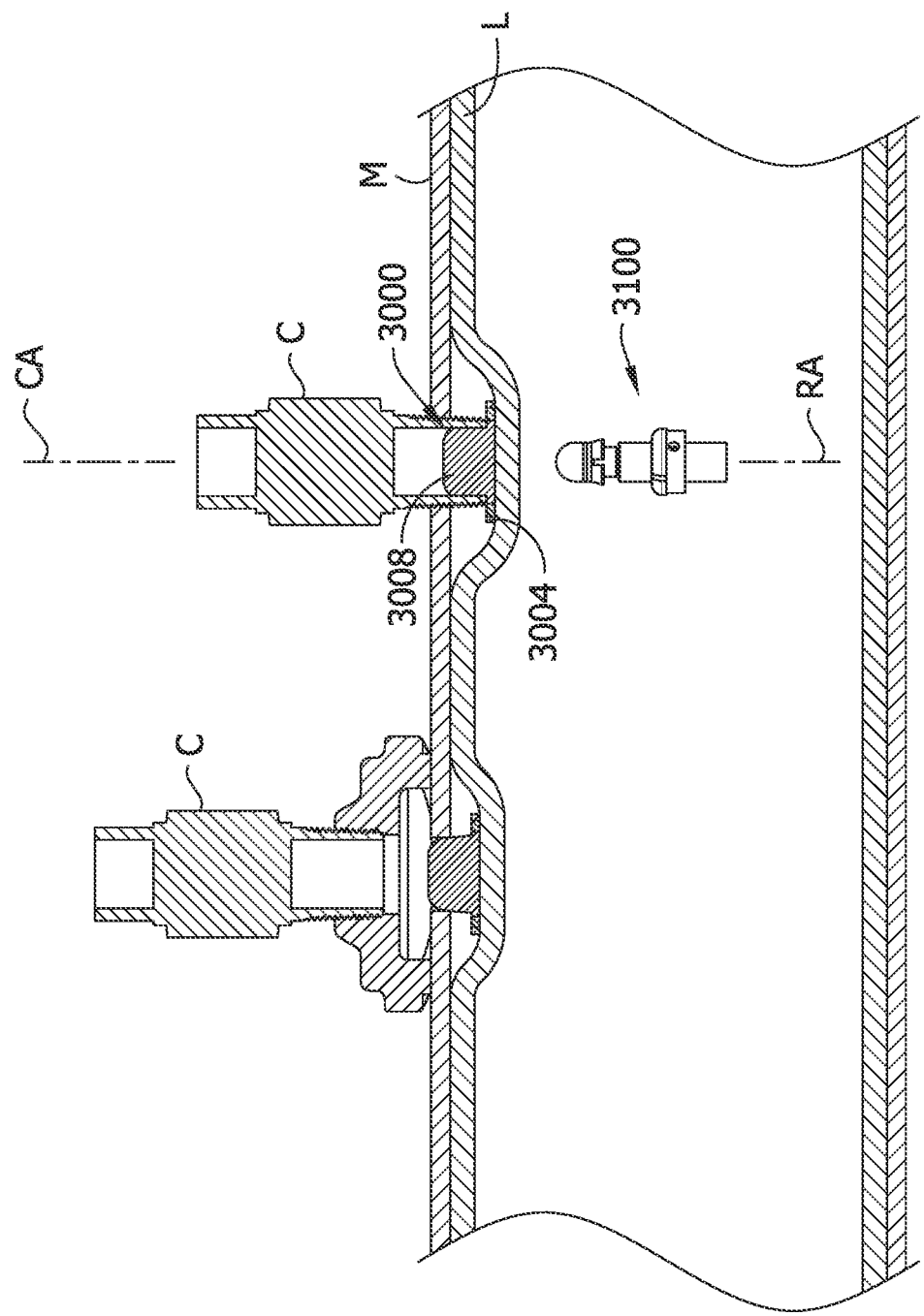
FIG. 7 is a longitudinal section similar to FIG. 2, showing the bit operatively aligned with one of the corporation stops inside the main pipe.

Referring now to FIGS. 3-6, an exemplary embodiment of a bit for removing the removable section 3008 of a plug 3000 from a corporation stop C is generally indicated at reference number 3100. In general, the bit 3100 comprises a shaft 3102 having a rotational axis RA. The shaft 3102 is broadly configured to be coupled to a drill of a robotic plug removal tool (see U.S. Patent Application Publication No. 2020/0173599) for being rotated about the axis RA. In the illustrated embodiment, the shaft 3102 comprises a two-piece shaft. That is, the shaft 3102 includes a proximal piece 3104 defining the proximal end portion of the shaft and a distal piece 3106 (FIG. 6) defining the distal end portion of the shaft. The proximal and distal end portions of the shaft 3102 are arranged along the rotational axis RA. The proximal piece 3104 is configured to couple the shaft to the drill of the plug removal tool. In the illustrated embodiment, the proximal piece 3104 has a through passage 3108 (FIG. 6), and the proximal end portion of the distal piece 3106 is received in the distal end portion of the through passage. The proximal and distal pieces 3104, 3106 are attached by a set screw 3110 (broadly, a removable fastener). FIG. 5 illustrates how the set screw fastens the proximal and distal pieces 3104, 3106 together in greater detail. The set screw 3110 can be loosened to disconnect the distal piece 3106 from the proximal piece 3104. In certain embodiments, the distal piece 3106 may be interchangeable with other distal pieces of different dimensions suitable for different sizes of the plugs 3000. It is also contemplated that the protruding length of the distal shaft piece 3106 which extends from the proximal piece 3104 may be adjustable by loosening the set screw 3100 and adjusting the distal piece lengthwise.

The bit 3100 comprises a boring head 3120 at the distal end portion of the shaft 3102. In the illustrated embodiment, the boring head 3120 is integrally formed with the distal shaft piece 3106 from a single monolithic piece of material. However, in other embodiments, the boring head may be formed separately from the shaft and may be attached to the shaft for conjoint rotation with the shaft about the rotational axis RA. In the illustrated embodiment, the boring head 3120 has an outer dimension OD1 (FIG. 4) that is enlarged in relation to a stem 3122 which forms the remainder of the distal shaft piece shaft piece 3106. As explained in further detail below, the stem 3122 is configured to support additional components of the bit 3100.

During use, the boring head 3120 is configured rotate about the rotational axis RA and bore a pilot hole 3010 (FIGS. 9 and 13) through the plug 3000 such that the pilot hole extends from the proximal end portion of the plug through the distal end portion of the plug along the axis CA. In the illustrated embodiment, the boring head 3120 has an outer dimension OD1 that is less than an outer dimension POD (FIG. 1) of the removable plug section 3008 so that the pilot hole 3010 is circumscribed by a perimeter portion 3012 of the plug body 3002 once formed (see FIGS. 9-13). In the illustrated embodiment, the boring head 3120 comprises an abrasive leading surface for forming the pilot hole 3010. But in other embodiments, the boring head 3120 can comprise other material removal features in lieu of or in addition to the abrasive surface for removing material from the plug to from the pilot hole.

The bit 3100 further comprises a burr 3130 on the shaft 3102 at a location spaced apart from the boring head 3120 in the proximal direction along the rotational axis RA. Suitably, the burr 3130 is spaced apart from the head 3120 by a spacing distance SD1 (FIG. 4) along the rotational axis RA that is greater than the length LP (FIG. 1) of the plug 3000. Like the boring head 3120, the burr 3130 is coupled to the shaft 3102 for conjoint rotation with the shaft about the rotational axis RA. In the illustrated embodiment, the burr 3130 is integrally formed with the proximal shaft piece 3104 from a single monolithic piece of material. But in other embodiments, the burr may be formed separately from the shaft and may be attached to the shaft for conjoint rotation with the shaft about the rotational axis. The burr 3130 has an outer dimension OD2 (FIG. 4) that is greater than the outer dimension OD1. Whereas the boring head 3120 is configured to form the pilot hole 3010 in the center of the removable plug section 3008 as explained above, the burr 3130 is configured to remove material from the inner axial end of the perimeter portion 3012 of the removable section. In particular, after the boring head 3120 bores the pilot hole 3010, the burr 3130 is configured to remove an annular corner portion of the plug body 3002 that connects the durable flange section 3004 to the removable section 3008. This separates the removable section 3008 from the durable section 3004 so that the removable section may be removed while leaving the durable section in place. In the illustrated embodiment, the burr 3130 comprises an abrasive leading surface for removing the annular corner portion of the plug body 3002 to separate the removable section 3008 from the durable section 3004. But in other embodiments, the burr can comprise other material removal features in lieu of or in addition to the abrasive surface for removing material from the plug body.

The illustrated bit 3100 further comprises a catch 3140 disposed on the shaft 3102 at a location spaced apart along the rotational axis RA between the burr 3130 and the boring head 3120. Thus, the catch 3140 is spaced apart from the boring head 3120 in the proximal direction, and the burr 3130 is spaced apart from the catch in the proximal direction. The catch 3140 is disposed on the stem 3122 of the distal shaft piece 3106. The catch 3140 comprises a proximal end portion and a distal end portion spaced apart along the rotational axis RA. The distal end portion of the illustrated catch 3140 forms an annular collar 3142 that is disposed about the stem 3122. The catch 3140 further comprises a plurality of circumferentially spaced, resiliently bendable arms 3144 that extend in the proximal direction from the collar portion 3142.

The catch 3140 is adjustable between an expanded configuration (shown in the drawings) and a collapsed configuration (not shown). The catch 3140 is resiliently biased to the expanded configuration. In the expanded configuration, each of the arms 3144 extends radially outward as it extends longitudinally in the proximal direction. The proximal ends of the expanded arms 3144 define a radially outer edge of the catch. As explained more fully below, this radially outer edge is configured to catch on the distal end portion of the removable section 3008 of the plug body 3002 so that the bit 3100 may remove the removable section when it is withdrawn from the corporation stop C. In the expanded configuration of the catch 3140, the radially outer edge of each arm 3144 is located at a first radial dimension from the rotational axis RA such that the catch has an outer dimension OD3 (FIG. 4) that is greater than the outer dimension OD1 of the boring head 3120. In the collapsed configuration, the radially outer edge is located at a second radial dimension from the rotational axis RA such that the catch 3140 has an outer dimension OD3' that is less than or equal to the outer dimension OD1. In the collapsed configuration of the catch 3140, the proximal ends of the arms 3144 are spaced apart from the distal end of the burr 3130 by a spacing distance SD2 (FIG. 4) along the axis RA that is greater than the length LP of the plug 3000.

The catch 3140 is configured to pass through the pilot hole 3010 as the boring head 3120 forms the pilot hole and the bit 3100 advances along the plug body 3002. As the catch 3140 enters the pilot hole 3010, the radially outward facing surfaces of the arms 3144 slide along the inner surface of the perimeter portion 3012, which bends the arms inward to the collapsed configuration. The bit 3100 is sized and arranged so that the entire length of the catch 3140 is configured to pass outwardly along the corporation stop axis CA through the outer end of the plug body 3002. After passing out of the outer end of the pilot hole 3010, the arms 3144 resiliently rebound so that the catch 3140 returns to the expanded configuration. After rebounding to the expanded configuration, the proximal end portion of the catch 3140, defined by the expanded arms 3144, is configured to engage the distal end portion of the removable section 3008 of the plug body 3002 such that the catch 3140 can push the removable section in the proximal direction when the bit is moved in the proximal direction In one or more embodiments, the catch 3140 is supported on the shaft 3102 so that the shaft can rotate relative to the catch. In the illustrated embodiment, the annular collar 3142 of the catch 3140 is attached to a bushing 3152 that can rotate freely on the stem 3122. The collar 3142 is positioned generally between the proximal end portion of the boring head 3120 and the distal end portion of the burr 3130. In addition, a bushing 3150 is disposed on the stem 3122 adjacent the proximal end of the annular collar 3142 of the catch 3140 such that the arms 3144 radially overlap the bushing with respect to the rotational axis RA. The bushing 3150 thus separates the arms 3144 from the shaft 3102 as the shaft rotates. As can be seen, the illustrated bushing 3150 has an outer dimension OD4 (FIG. 4) that is less than the outer dimension OD1 of the boring head 3120. The outer dimension OD4 is sized to enable the arms 3144 to fit over the bushing 3150 yet within the pilot hole 3010 when the catch 3140 is collapsed.

The illustrated bit 3100 further comprises a pair of spacers 3152, 3154 disposed on the shaft for supporting the catch 3140 and the bushing 3150 at the appropriate locations along the length of the stem 3122. An annular catch spacer 3152 extends circumferentially about the stem 3122 and includes a portion extending longitudinally between the boring head 3120 and the distal end of the catch 3140. Likewise, an annular bushing spacer 3154 extends circumferentially about the stem 3122 and extends longitudinally between the burr 3130 and the proximal end of the bushing 3150. Each of the spacers 3152, 3154 has an outer dimension that is substantially the same as the outer dimension OD1 of the boring head 3120.

Figure 8:
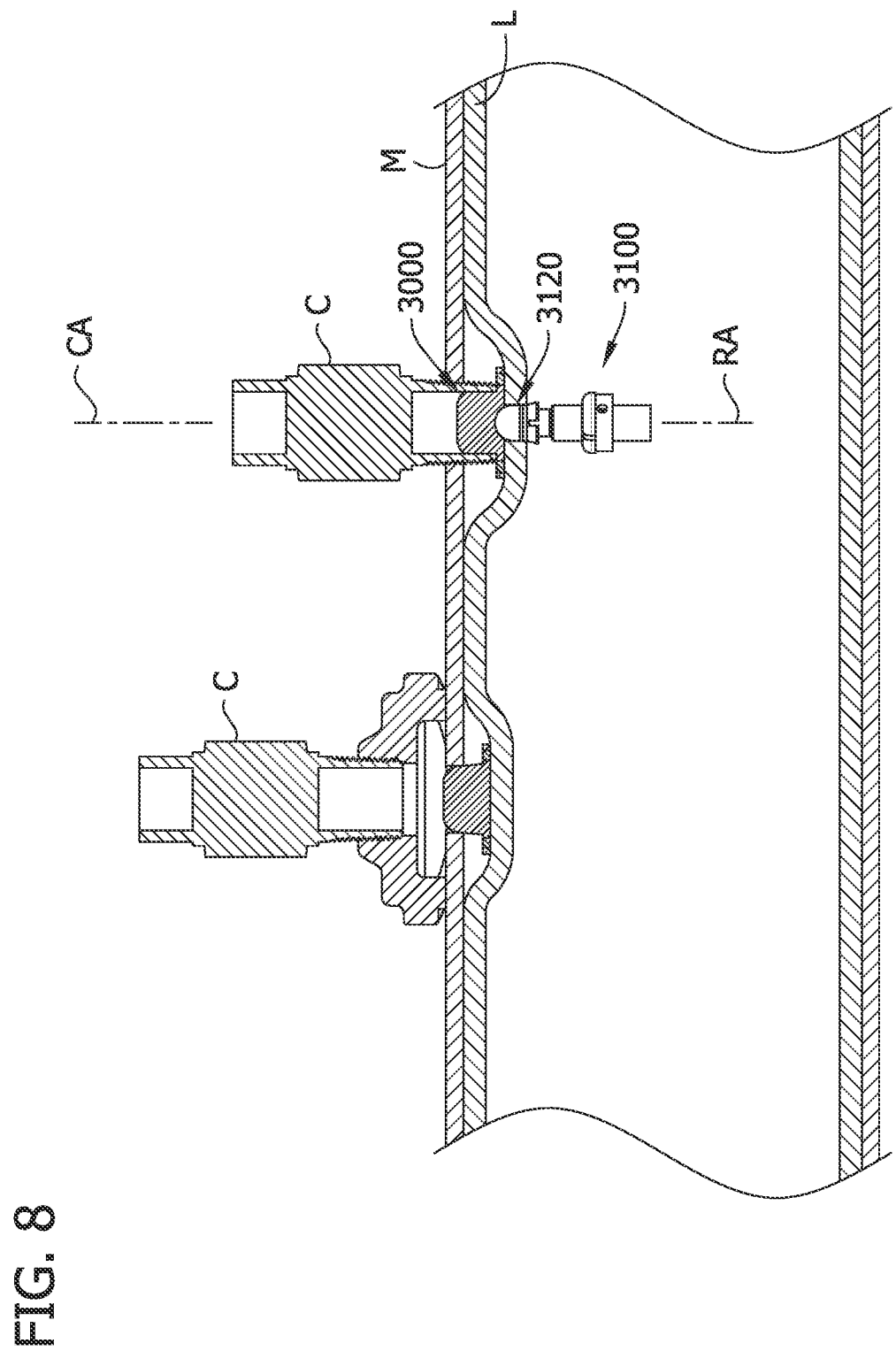
FIG. 8 is a longitudinal section similar to FIG. 7, showing a boring head of the bit boring through the liner and plug to form a pilot hole.
Figure 9:
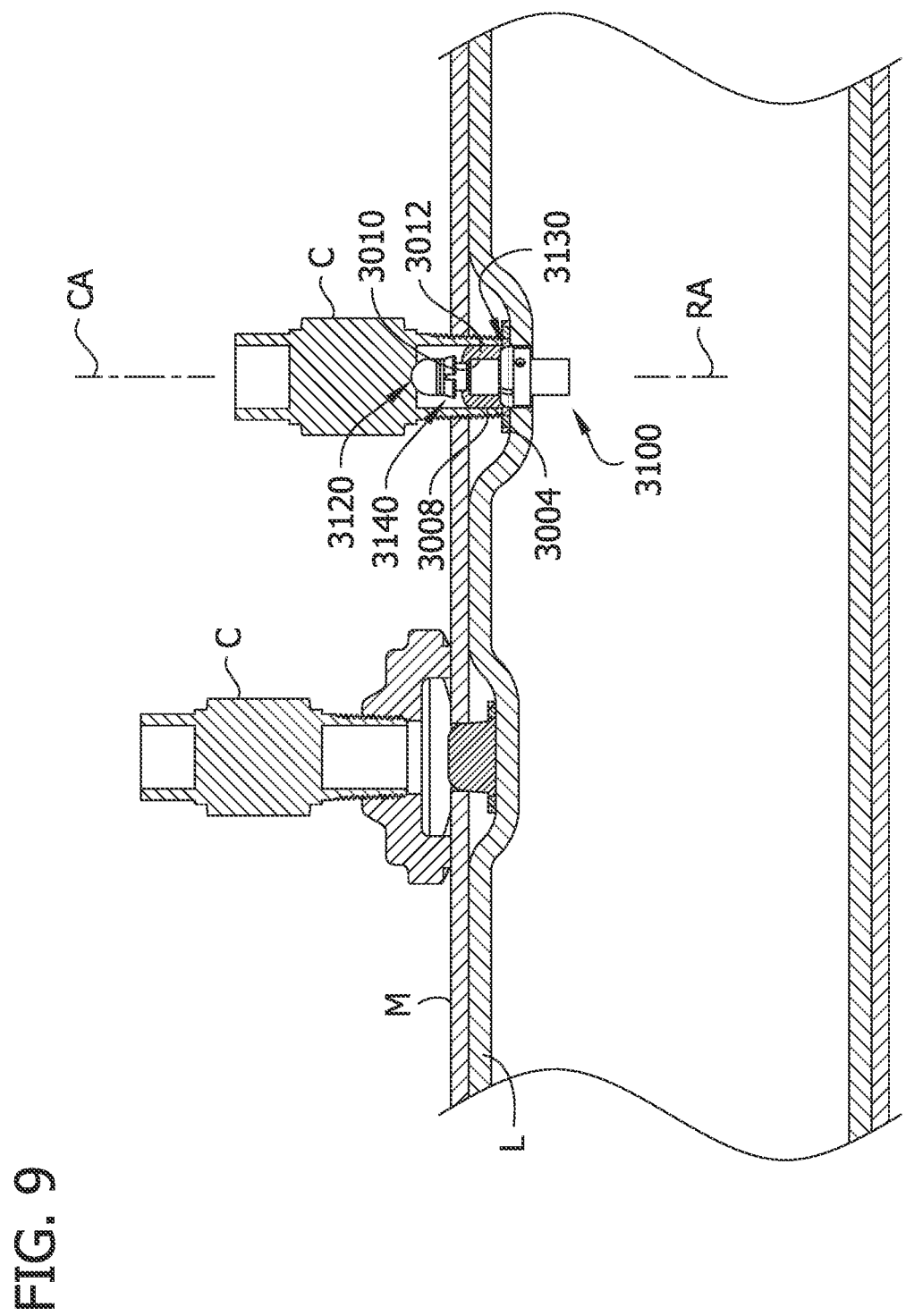
FIG. 9 is a longitudinal section similar to FIGS. 7-8, showing a burr of the bit boring through a corner region of the plug.

An exemplary method of using the bit 3100 in a pipe rehabilitation process will now be briefly described in reference to FIGS. 1-2 and 7-14. Initially, as shown in FIG. 1, the plugs 3000 are inserted into the corporation stops C, and then as shown in FIG. 2, the main pipe P is lined with a liner L. Subsequently, a bit 3100 is selected that has (i) a diameter OD1 that is less than the plug diameter POD, (ii) a burr diameter OD2 that is greater than the plug diameter POD but less than twice the radial distance RL at which the locating elements 3006 are set about the corporation stop axis CA, and (iii) a spacing distance SD2 that is greater than the length LP of the plug 300. The selected bit 3100 is operatively connected to the drill of a suitable robotic plug removal tool (not shown), and then a robot carries the tool to each of the plugged and lined corporation stops C. FIG. 8 shows how the robot aligns the bit 3100 with one of the corporation stop C so that the rotational axis RA is generally coaxial with the corporation stop axis CA. The robot then uses the drill to rotate the aligned bit 3100 and simultaneously advances the bit outwardly along the corporation stop axis CA, as shown in FIGS. 8-9.

Figure 10:
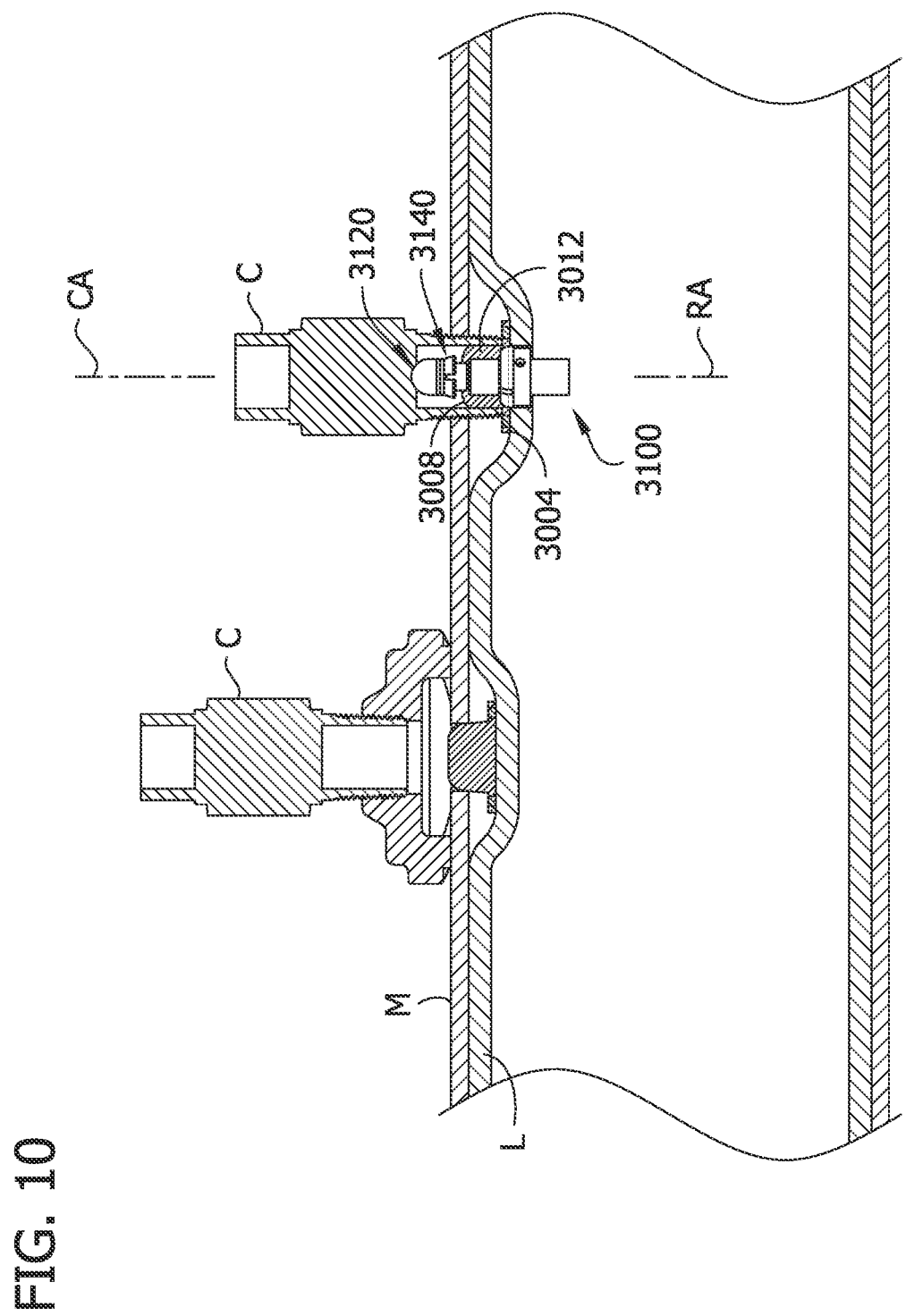
FIG. 10 is a longitudinal section similar to FIGS. 7-9, showing the bit being withdrawn from the corporation stop with a removable section of the plug.
Figure 11:
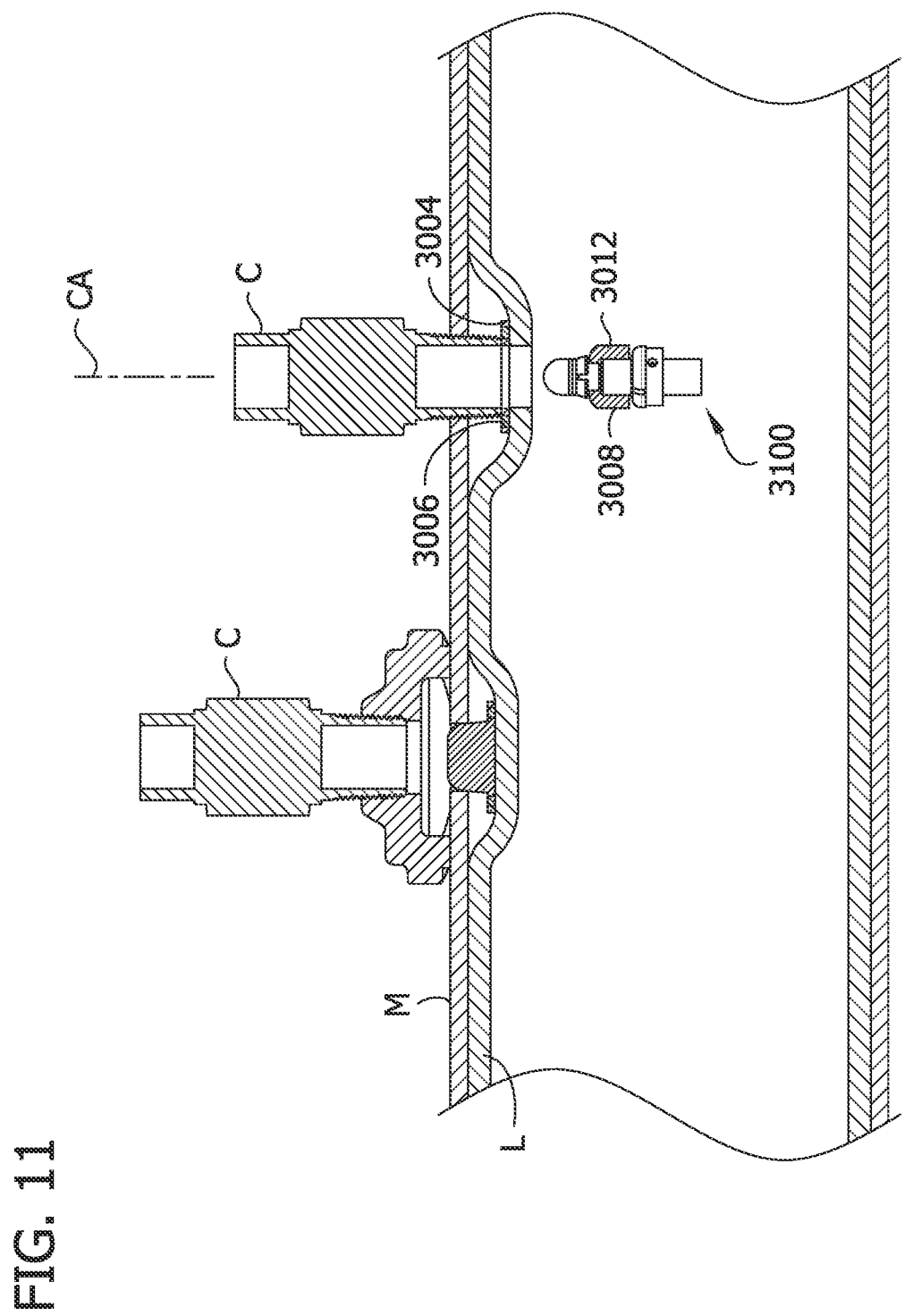
FIG. 11 is a longitudinal section similar to FIGS. 7-10, showing the bit removed from the corporation stop with a removable section of the plug attached.

The boring head 3120 forms a pilot hole 3010 in the central portion of the plug body 3002 as the bit 3100 advances. In addition, the radially outward facing surfaces of the arms 3144 slide along the perimeter portion 3012 of the plug body 3002, which bends the arms inward to the collapsed configuration. The boring head 3120 and the catch 3140 successively pass through the outer end of the plug body 3002. When the catch 3140 passes through the outer end, the arms 3144 resiliently rebound to their expanded positions. The robot continues to advance and simultaneously rotate the bit 3100 such that the burr 3130 engages the annular corner portion of the plug body 3002 as shown in FIG. 9, i.e., the portion which connects the removable section 3008 to the durable section 3004. The burr 3130 removes this annular corner portion to separate the removable section 3008 and the durable section 3004. After the two sections 3004, 3008 are separated, the robot withdraws the bit 3100 inwardly along the corporation stop axis CA as shown in FIGS. 10-11. The proximal ends of the arms 3144 engage the distal end portion of the removable section 3008 and push the removable section inward along the corporation stop axis CA. This dislodges and removes the removable section 3008 from the corporation stop C so that only the durable section 3004 remains. Initially, the perimeter portion 3012 of the removable section 3008 may remain attached to the bit 3100 after the bit is withdrawn. In other words, the perimeter portion 3012 of the removable section 3008 moves together with the bit 3100 until action is taken to separate the perimeter portion from the bit.

Figure 12:
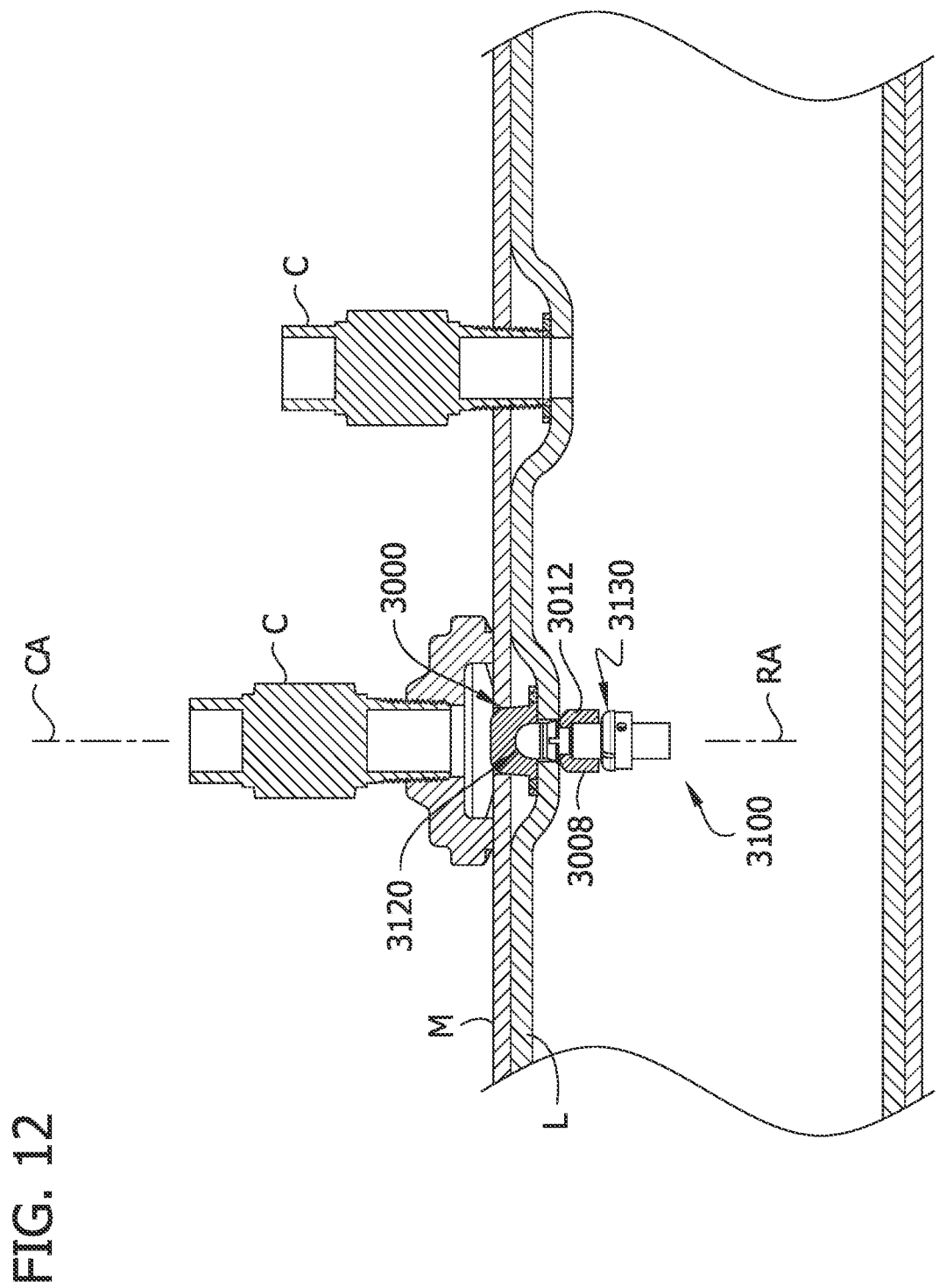
FIG. 12 is a longitudinal section similar to FIGS. 7-11, showing a boring head of the bit boring through the liner and plug of another corporation stop so that the attached removable plug section is separated from the bit by the action of the burr.
Figure 13:
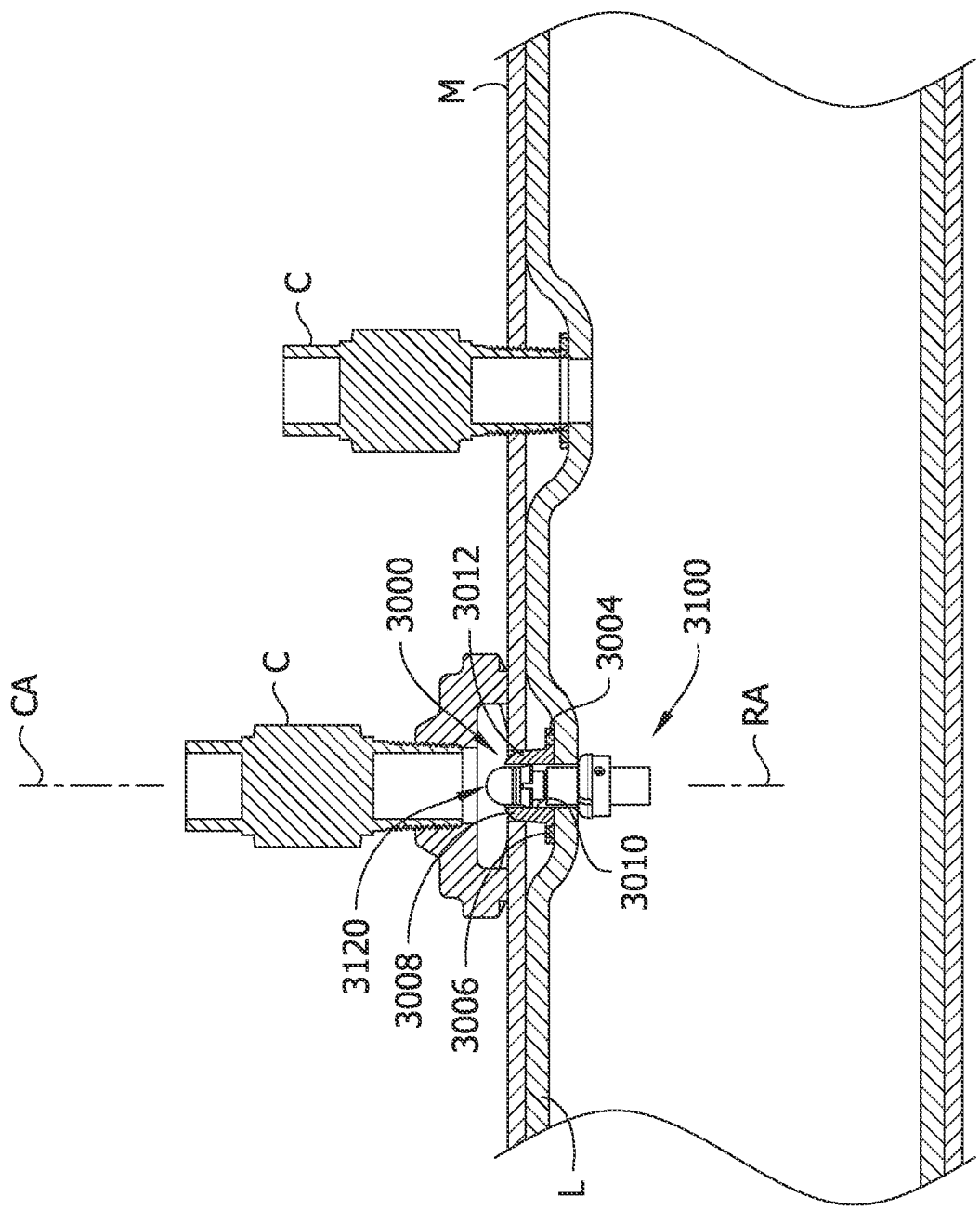
FIG. 13 is a longitudinal section similar to FIGS. 7-12, showing the bit advanced into the second corporation stop a sufficient distance that the removable plug section that was attached to the bit has been separated from the bit.
Figure 14:
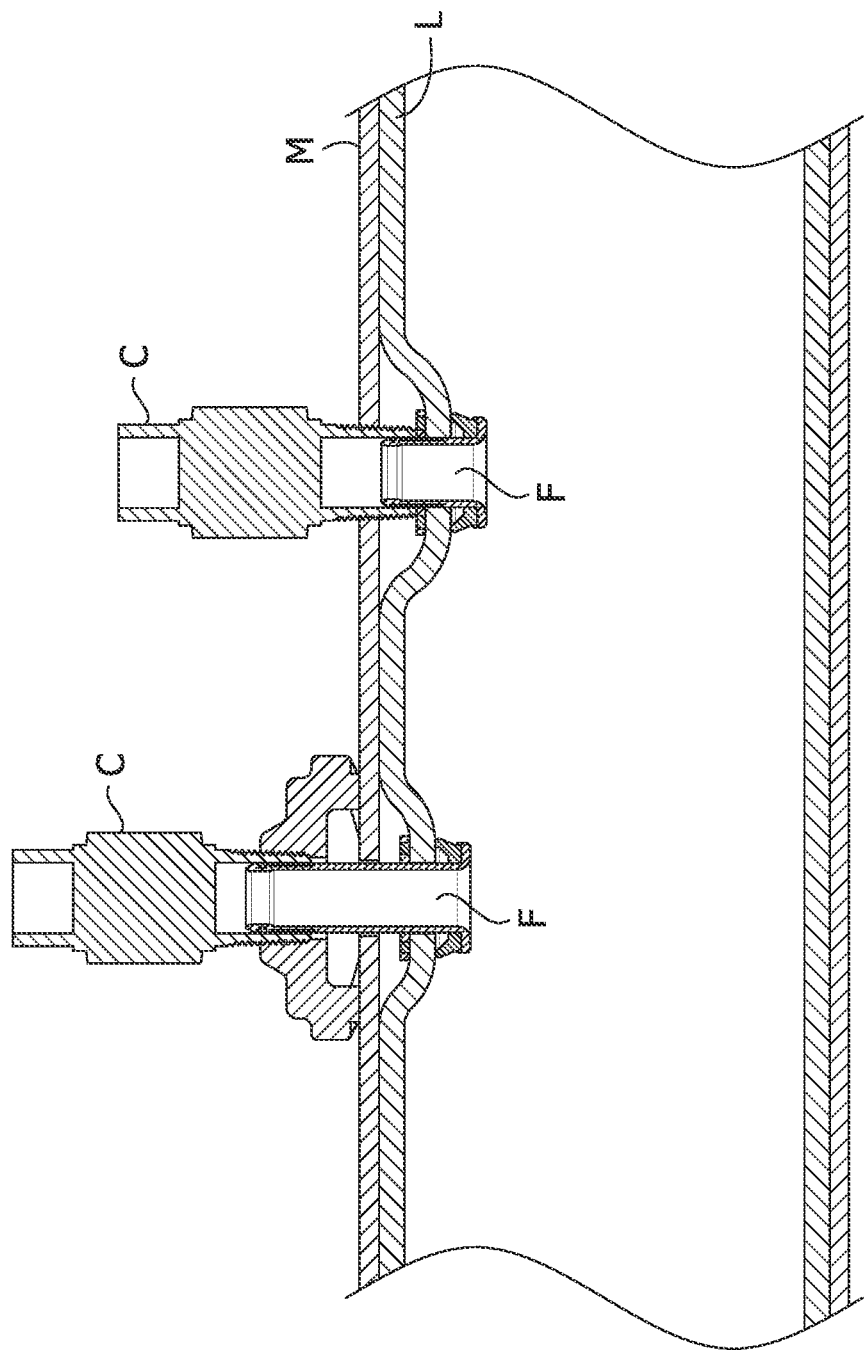
FIG. 14 is a longitudinal section similar to FIGS. 7-13, showing fittings installed in each of the corporation stops after removable sections of the plugs have been removed.

As shown in FIGS. 12-13, the robot then repeats the above-described plug removal steps at each of the other corporation stops C that have been plugged and covered by the liner L. When the bit 3100 advances along a corporation stop axis CA into a successive corporation stop C, the removable section 3008 of the previous corporation stop initially remains attached to the bit along the stem 3122, between the burr 3130 and the catch 3140. However, the attached removable section 3008 is separated from the bit 3100 by advancing the bit into the subsequent plug 3000. When this occurs, the burr 3130 advances through the attached removable section 3008 after it is pressed against the liner L. This breaks the attached removable section 3008 apart and separates it from the bit 3100 without requiring the robot to be removed from the main pipe M. Thus, the bit can be used in essentially the same manner to remove the removable section 3008 of each plug 3000 and restore fluid communication to each corporation stop C. As shown in FIG. 14 and described more fully in U.S. Patent Application Publication No. 2020/0173599, fittings F may be installed in each of the corporation stops after using the bit 3100.

Referring now to FIGS. 15-18, another exemplary embodiment of a bit for removing the removable section 3008 of a plug 3000 from a corporation stop C is generally indicated at reference number 4100. In general, the bit 4100 comprises a shaft 4102 having a rotational axis RA1. The shaft 4102 is broadly configured to be coupled to a drill of a robotic plug removal tool (see U.S. Patent Application Publication No. 2020/0173599) for being rotated about the axis RA1. In the illustrated embodiment, the shaft 4102 comprises a two-piece shaft. The two-piece shaft 4102 includes a proximal piece 4104 defining the proximal end portion of the shaft and a distal piece 4106 (FIG. 17) defining the distal end portion of the shaft. The proximal piece 4104 is configured to couple the shaft to the drill of the plug removal tool. In the illustrated embodiment, the proximal piece 4104 has a through passage 4108 (FIG. 17), and the proximal end portion of the distal piece 4106 is received in the distal end portion of the through passage. The proximal and distal pieces 4104, 4106 are attached by a pin 4110 (broadly, a fastener), which could be replaced with a set screw or any other suitable fastener without departing from the scope of the disclosure.

The bit 4100 comprises a boring head 4120 at the distal end portion of the shaft 4102. In the illustrated embodiment, the boring head 4120 is integrally formed with (broadly, fixedly attached to) the distal shaft piece 4106 from a single monolithic piece of material. The boring head 4120 can be made of a suitable material, such as tungsten carbide. In other embodiments, the boring head may be formed separately from the shaft and may be attached to the shaft for conjoint rotation with the shaft about the rotational axis RA1. In the illustrated embodiment, the boring head 4120 has an outer dimension OD5 (FIG. 16) that is enlarged in relation to a stem 4122 which forms the remainder of the distal shaft piece 4106. During use, the boring head 4120 is configured rotate about the rotational axis RA and bore a pilot hole 3010 into or through the plug 3000 such that the pilot hole extends from the proximal end portion of the plug toward the distal end portion of the plug along the axis CA. The outer dimension OD5 is less than an outer dimension POD (FIG. 1) of the removable plug section 3008 so that the pilot hole 3010 is circumscribed by a perimeter portion 3012 of the plug body 3002 once formed (see, FIG. 21).

In the illustrated embodiment, the boring head 4120 has a shape similar to a fluted drill bit. The boring head 4120 has a proximal end surface 4202 and a distal end surface 4204 spaced apart along the rotational axis RA1. The proximal end surface 4202 forms a proximal shoulder with the stem 4122, and forms the catch of this embodiment of the bit 4100. The way the proximal end surface 4202 functions as a catch is described further below. The distal end surface 4204 is generally cone-shaped. The boring head 4120 comprises a plurality of cutting elements 4210 separated by flutes 4212 such that the cutting elements are circumferentially spaced apart about the rotational axis RA1. In the illustrated embodiment, the boring head 4120 includes two cutting elements 4210, but other numbers of cutting elements could be used without departing from the scope of the disclosure. Further, other boring head designs besides those incorporating cutting elements could be used without departing from the scope of the disclosure.

Figure 15:
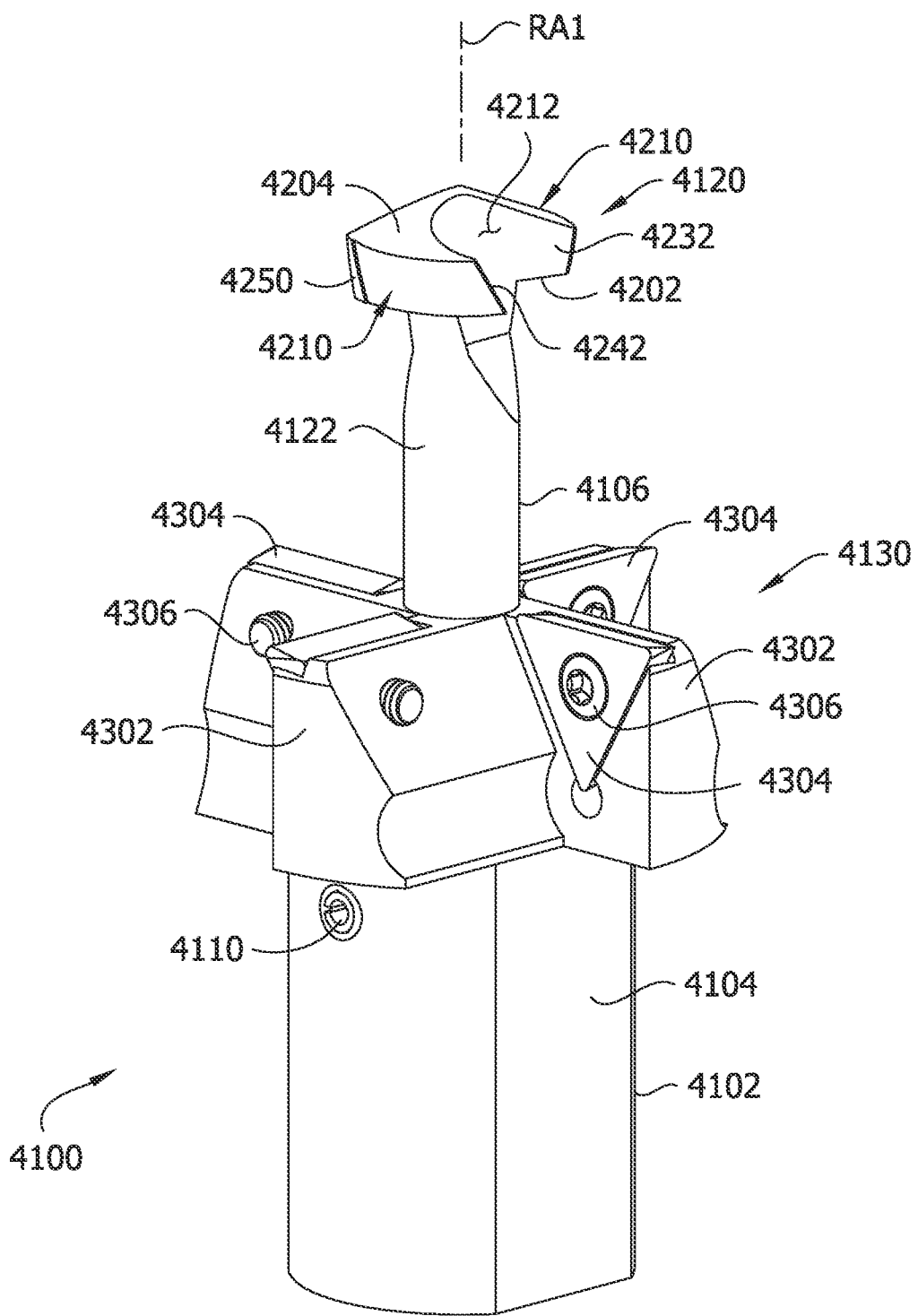
FIG. 15 is a perspective of another embodiment of a bit for removing a plug from a corporation stop.
Figure 16:
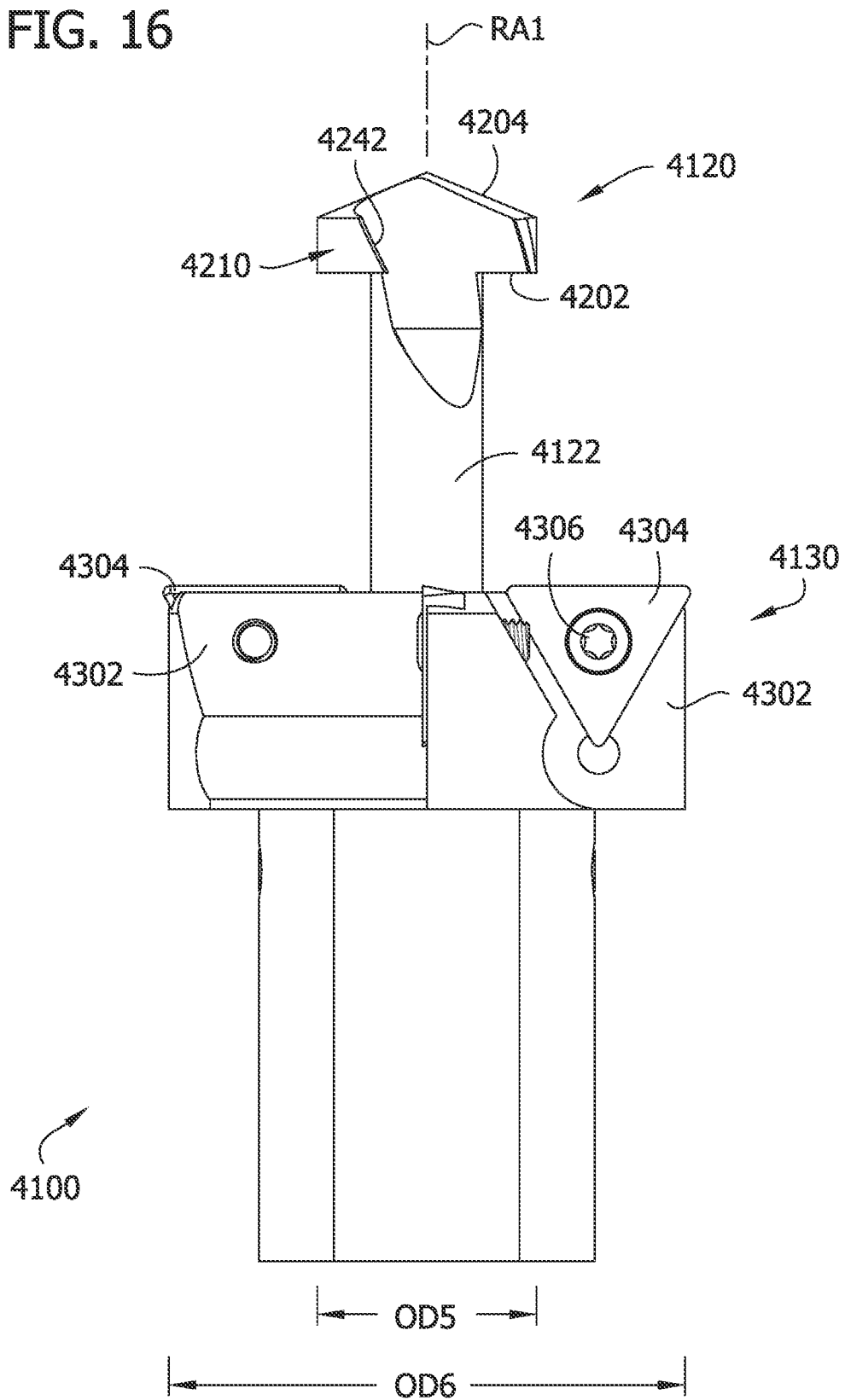
FIG. 16 is an elevation of the bit of FIG. 15.
Figure 17:
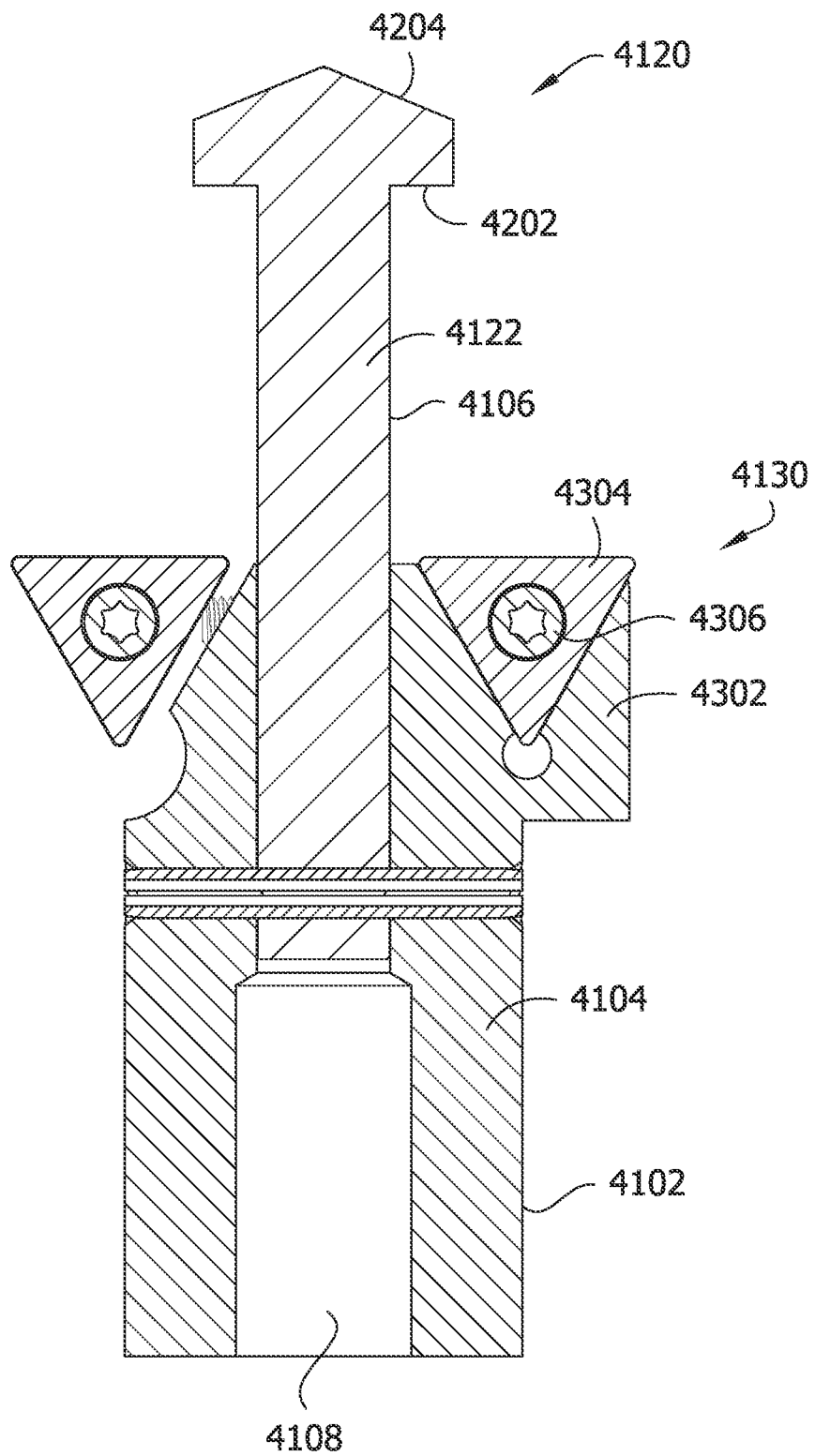
FIG. 17 is a longitudinal cross section of the bit of FIG. 15.
Figure 18:
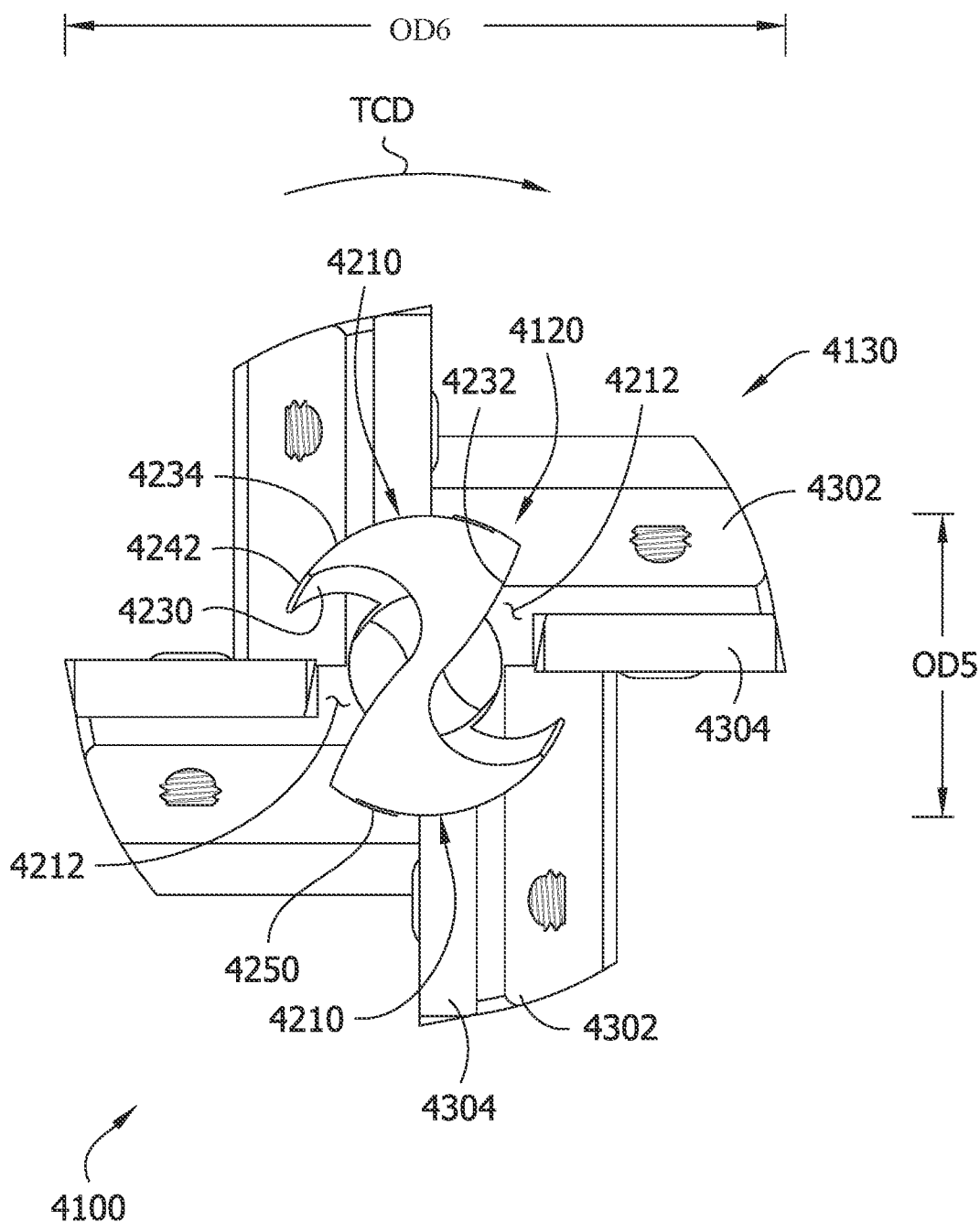
FIG. 18 is a top plan view of the bit of FIG. 15.

As shown in FIGS. 15 and 18, each cutting element 4210 comprises a leading surface 4230, a trailing surface 4232 circumferentially spaced apart from the leading surface about the rotational axis in a trailing circumferential direction TCD, and a radially outer perimeter surface 4234. Each of the leading surface 4230, the trailing surface 4232, and the radially outer perimeter surface 4234 extend generally axially from the proximal end surface 4202 to the distal end surface 4204. The leading surface 4230 intersects the distal end surface 4204 at a helical leading distal edge configured to cut into the plug 3000 as the bit 4100 rotates and advances axially. The leading surface 4230 and the radially outer perimeter surface 4234 intersect at a leading edge 4242 and form an arcuate wedge that extends in a trailing direction from the leading edge. In the illustrated embodiment, the leading edge 4242 extends axially from the proximal surface 4202 to the distal surface 4204 and slopes in the trailing circumferential direction TCD as it extends axially from the proximal surface to the distal surface. The leading edge 4242 and wedge facilitate cutting through the plug 3000 as the bit 4100 rotates while advancing axially through the plug. As explained more fully below, the leading edge 4242 also facilitates cutting into the plug 3000 when the bit is moved in a radial direction with respect to the rotational axis RA1 while rotating about the rotational axis.

Figure 26:
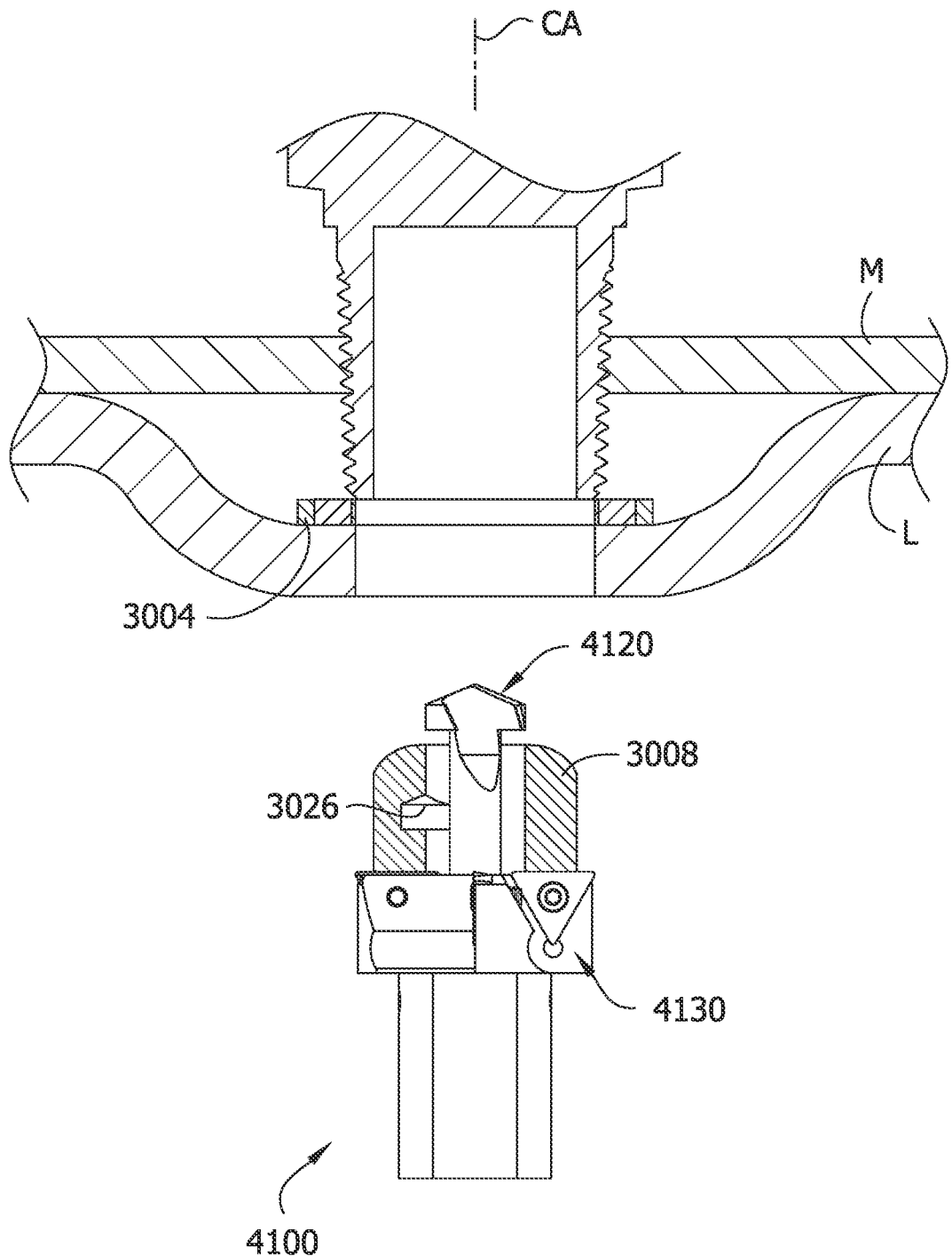
FIG. 26 is an enlarged longitudinal section similar to FIGS. 22-25, showing the bit of FIG. 15 adjusted to center the removable section of the plug on a stem of a shaft of the bit.

In broad terms, the boring head 4120 has a radially outer perimeter portion configured to bear against an inner perimeter portion of the plug 3000 from within the pilot hole 3010 to form a notch 3026 in the plug (see FIG. 26). The catch defined by the proximal surface 4202 of the boring head 4120 is configured to engage the plug 3000 from within the notch 3026 for pushing the plug in the proximal direction as the bit is moved in the proximal direction. The cutting elements 4210 are configured to facilitate forming the notch 3026 by moving the bit 4100 radially with respect to the rotational axis RA1 while the boring head 4120 is rotating inside the pilot hole. The leading edge 4242 of each cutting element 4120 will cut into the plug when the bit 4100 moves radially while rotating. In addition, each of the illustrated cutting elements 4210 comprises a perimeter cutting tang 4250 (FIG. 15) projecting radially outward from the radially outer perimeter surface 4234. Each cutting tang 4250 includes a leading tang surface visible in FIG. 15. The leading tang surface is oriented transverse to the radially outer perimeter surface 4234. The leading tang surface 4252 is spaced apart from the leading edge 4242 in the trailing circumferential direction TCD and faces in an opposite leading circumferential direction. During use, as the bit 4100 moves radially while rotating in the leading circumferential direction, the cutting tangs 4250 bear against the plug, and thereby remove plug material to form the notch 3026. It is also envisioned that the boring head 4120 may grab the removable portion 3008 by moving laterally without rotation of the bit 4100. The edges of the boring head 4120 are sharp and the plug material is typically somewhat soft. Thus the boring head 4120 may simply be pressed by radial movement without rotation into the plug 3000 so that the plug material is deformed and some of the plug material underlines the surface 4202 of the boring head.

Similar to the bit 3100 discussed above, the bit 4100 further comprises a burr 4130 on the shaft 4102 at a location spaced apart from the boring head 4120 in the proximal direction. Like the boring head 4120, the burr 4130 is coupled to the shaft 4102 for conjoint rotation with the shaft about the rotational axis RA. In the illustrated embodiment, the distal end portion of the proximal shaft piece 4104 defines a plurality of mounts 4302 at spaced apart locations about the rotational axis RA1. Each mount 4302 mounts a replaceable shaving blade 4304 that is configured to shave off a portion of the plug 3000 when the distal end of the blade bears against the plug while the bit 4100 is rotating about the rotational axis RA1. In the illustrated embodiment, the blades 4304 are fixedly attached to the mounts 4302 by screws 4306 (broadly, removable fasteners) so that the blades can be replaced if they become worn. In one embodiment, the blades 4304 are made of tungsten carbide or other suitably hard material. Blades of this type are readily available in the marketplace.

The burr 4130 has an outer dimension OD6 (FIG. 18) that is greater than the outer dimension OD5. Whereas the boring head 4120 is configured to form the pilot hole 3010 in the center of the removable plug section 3008 as explained above, the burr 4130 is configured to remove material from the inner axial end of the perimeter portion 3012 of the removable section. In particular, after the boring head 3120 bores the pilot hole 3010, the burr 3130 is configured to remove an annular corner portion of the plug body 3002 that connects the durable flange section 3004 to the removable section 3008. This separates the removable section 3008 from the durable section 3004 so that the removable section may be removed while leaving the durable section in place.

Figure 19:
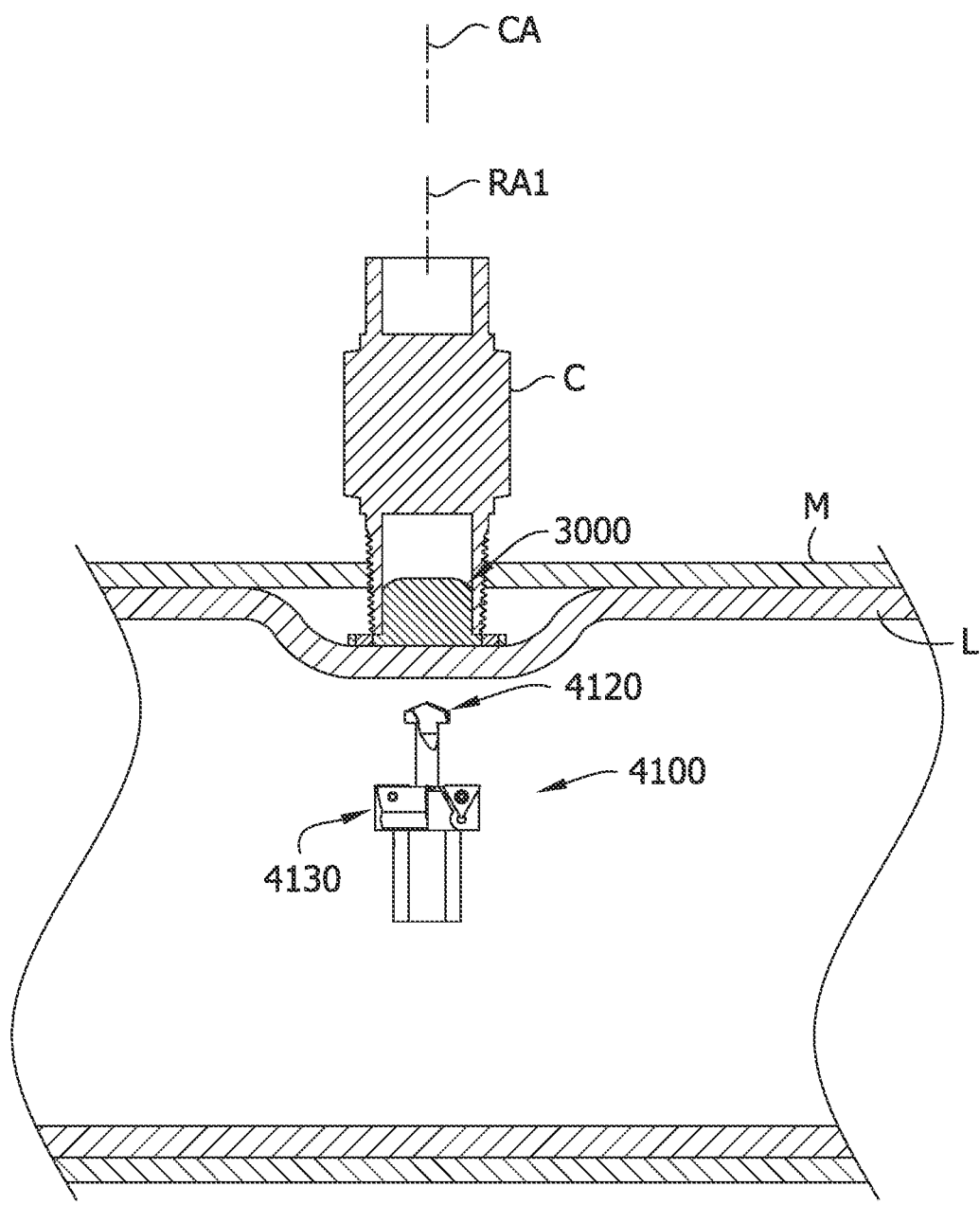
FIG. 19 is a longitudinal section similar to FIG. 2, showing the bit of FIG. 15 operatively aligned with one of the corporation stops inside the main pipe.
Figure 20:
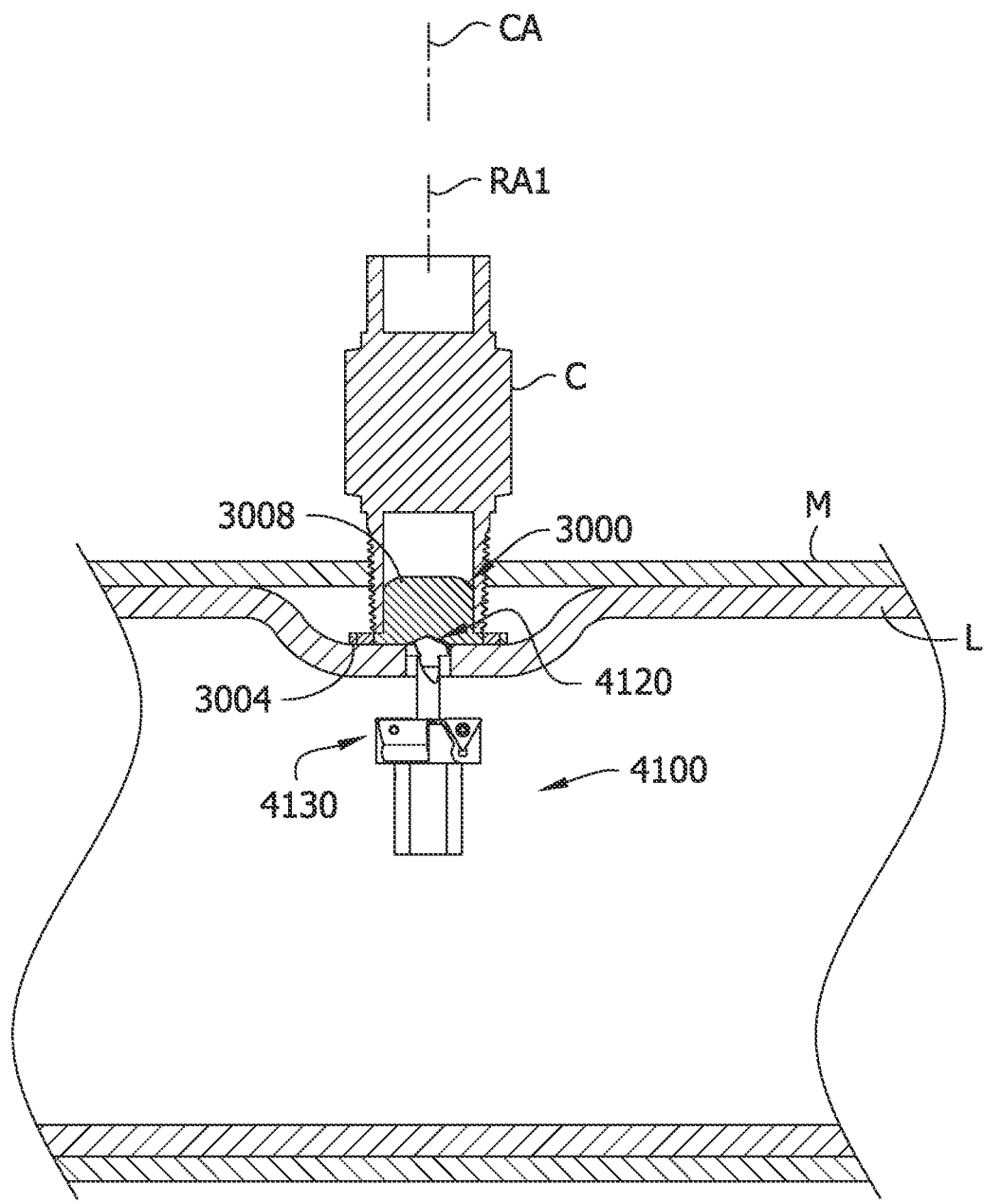
FIG. 20 is a longitudinal section similar to FIG. 19, showing a boring head of the bit of FIG. 15 boring through the liner and plug to form a pilot hole.
Figure 21:
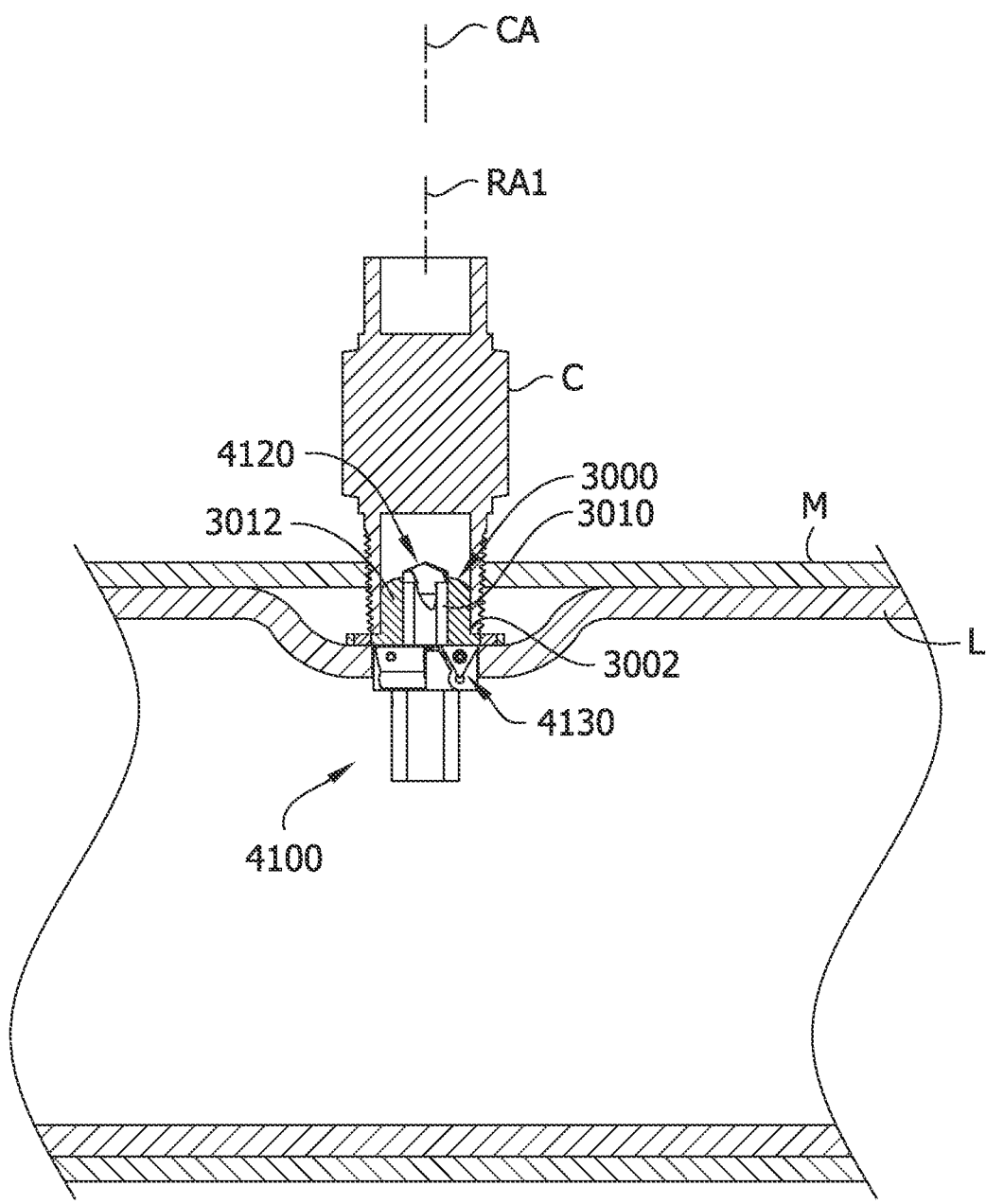
FIG. 21 is a longitudinal section similar to FIG. 20, showing the bit of FIG. 21 further advanced through the plug.
Figure 22:
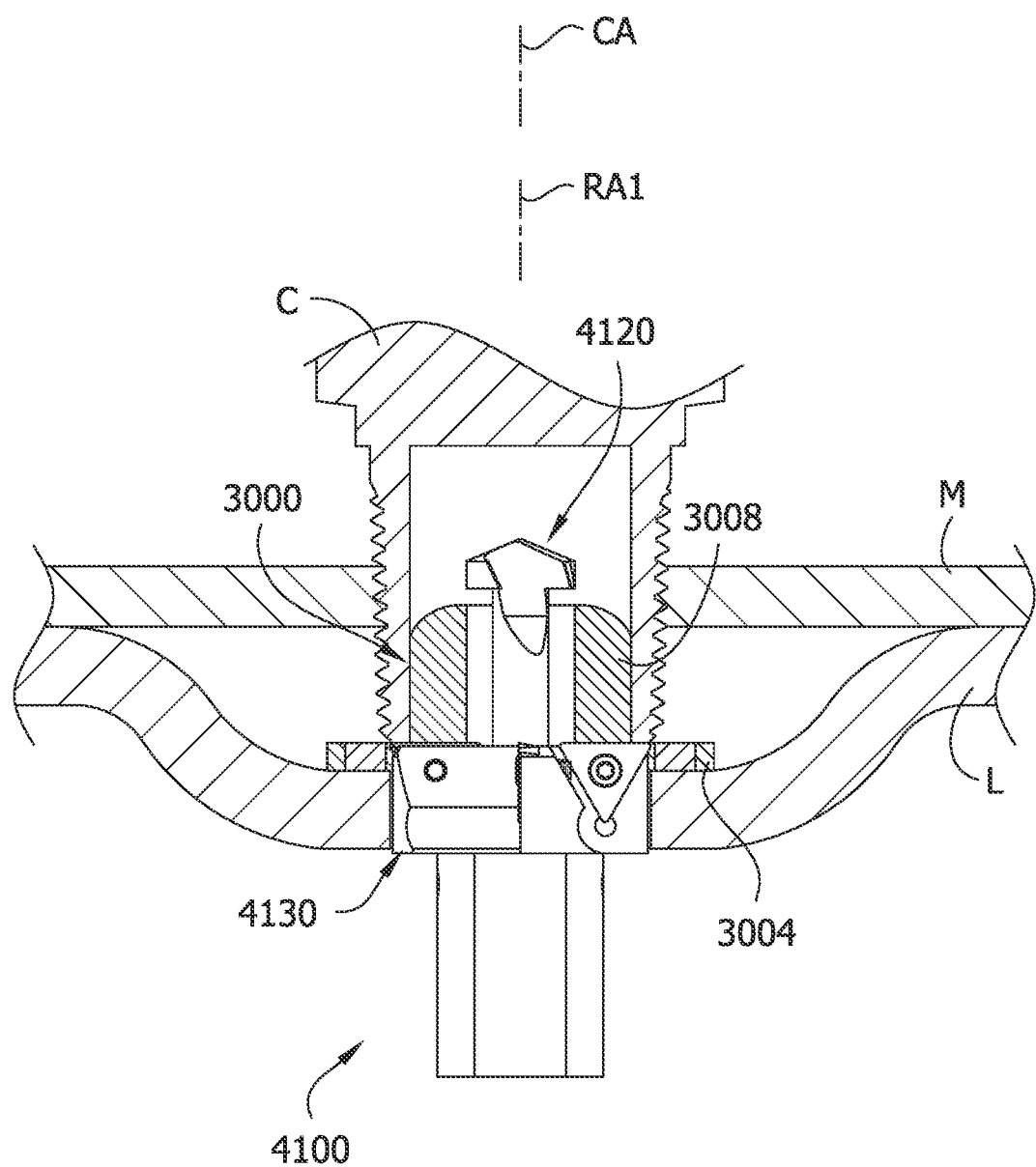
FIG. 22 is an enlarged longitudinal section, showing the burr of the bit of FIG. 15 removing a corner portion of the plug.

An exemplary method of using the bit 4100 in a pipe rehabilitation process will now be briefly described in reference to FIGS. 1-2 and 19-28. Initially, as shown in FIG. 1, the plugs 3000 are inserted into the corporation stops C, and then as shown in FIG. 2, the main pipe P is lined with a liner L. Subsequently, a bit 4100 is selected that has (i) a diameter OD5 that is less than the plug diameter POD and (ii) a burr diameter OD6 that is greater than the plug diameter POD but less than twice the radial distance RL at which the locating elements 3006 are set about the corporation stop axis CA. The selected bit 4100 is operatively connected to the drill of a suitable robotic plug removal tool RPT (see FIGS. 27-28). FIG. 19 shows how the robot aligns the bit 4100 with one of the corporation stops C so that the rotational axis RA1 is generally coaxial with the corporation stop axis CA. The robot RPT then rotates the aligned bit 4100 and simultaneously advances the bit outwardly along the corporation stop axis CA, as shown in FIGS. 20-22.

The boring head 4120 forms a pilot hole 3010 in the central portion of the plug body 3002 as the bit 4100 advances. In the illustrated embodiment, the boring head 4120 is shown forming a pilot hole 3010 that passes through the distal end of the plug body 3002, but with the bit 4100, it is not strictly necessary that the pilot hole 3010 extend entirely through the distal end. As shown in FIGS. 21-22, the robot RPT continues to advance and simultaneously rotate the bit 4100 such that the burr 4130 engages the annular corner portion of the plug body 3002 as shown in FIG. 21. The burr 4130 removes this annular corner portion to separate the removable section 3008 and the durable section 3004.

Figure 23:
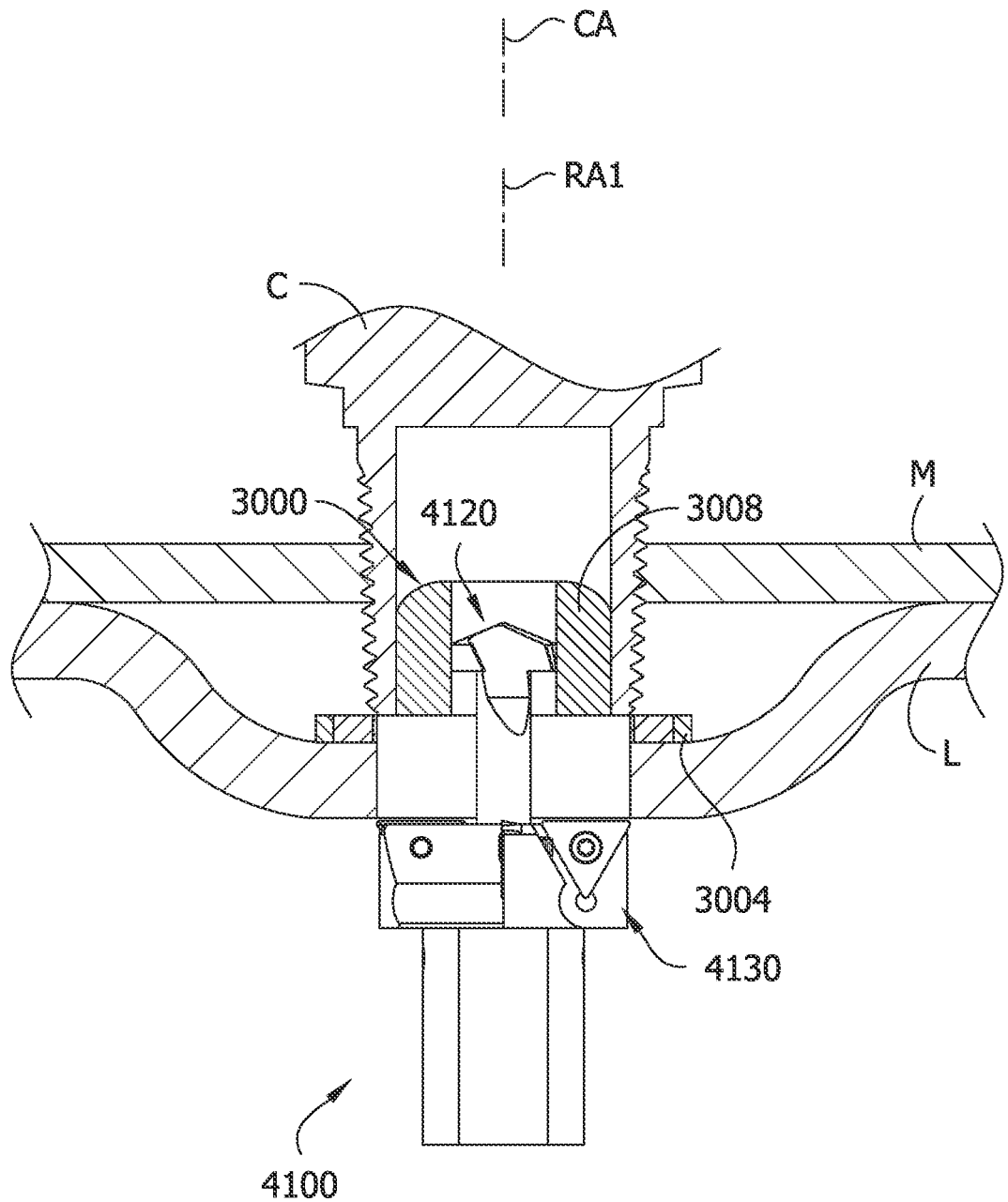
FIG. 23 is an enlarged longitudinal section similar to FIG. 22 showing the bit of FIG. 14 being withdrawn so that the burr clears the liner.
Figure 24:
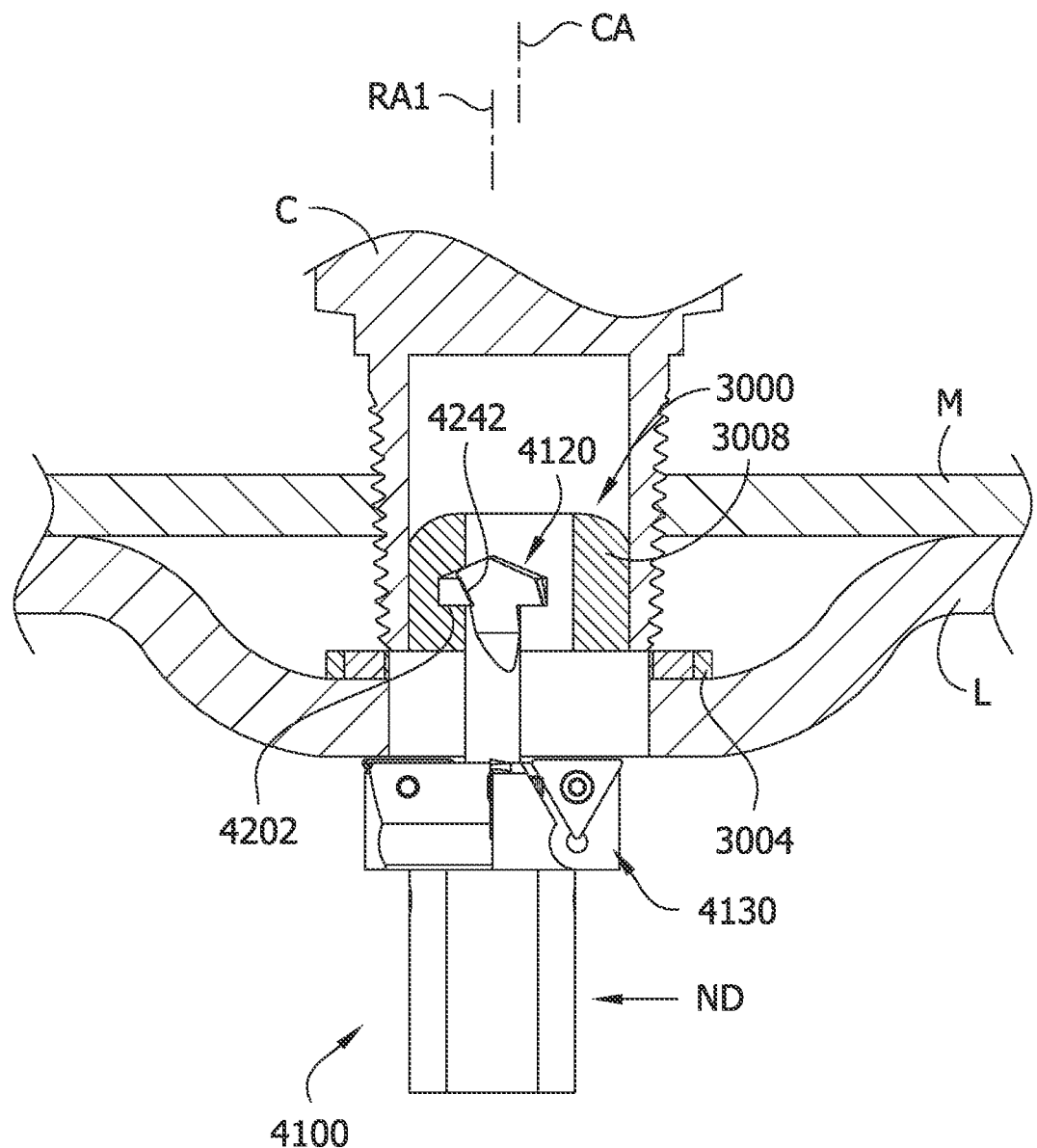
FIG. 24 is an enlarged longitudinal section similar to FIGS. 22-23, showing the bit of FIG. 15 forming a notch in a removable section of the plug.
Figure 25:
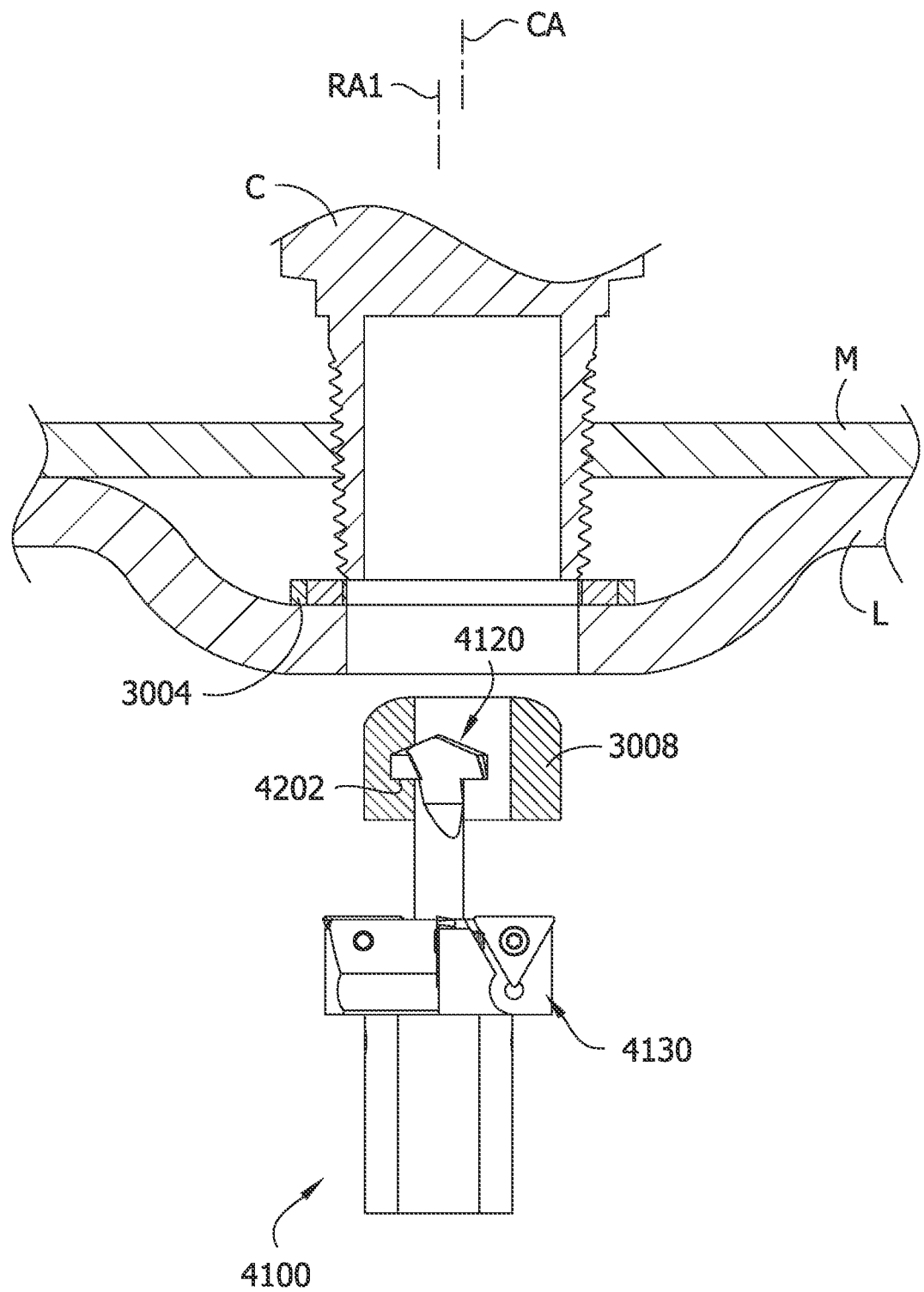
FIG. 25 is an enlarged longitudinal section similar to FIGS. 22-24 showing the bit of FIG. 15 being withdrawn to remove the removable section of the plug.

After the two sections 3004, 3008 are separated, the robot RPT withdraws the bit 4100 inwardly along the corporation stop axis CA as shown in FIG. 23 until the burr 4130 clears the inner surface of the liner L. As shown in FIG. 24, the robot then rotates the bit 4100 about the rotational axis RA1 and moves the bit in a notching direction ND perpendicular to the rotational axis. This causes the radially outer perimeter portion of the boring head 4120 the bear against the inner perimeter portion of the plug 3000. The leading edges 4242 of the cutting elements 4210 and the tangs 4250 remove plug material to form a notch 3026 (see FIG. 26). When the notch 3026 is of sufficient size, the robot locates one of the cutting elements 4210 within the notch so that the proximal end surface 4202 engages the proximal end of the notch as a catch. The robot RPT then withdraws the bit 4100 inward along the corporation stop axis CA to dislodge and remove the removable section 3008 from the corporation stop C so that only the durable section 3004 remains. As shown in FIGS. 25 and 26, the removable section 3008 may remain attached to the bit 4100 after the bit is withdrawn. In other words, the removable section 3008 moves together with the bit 4100 until action is taken to separate the perimeter portion from the bit.

Figure 27:
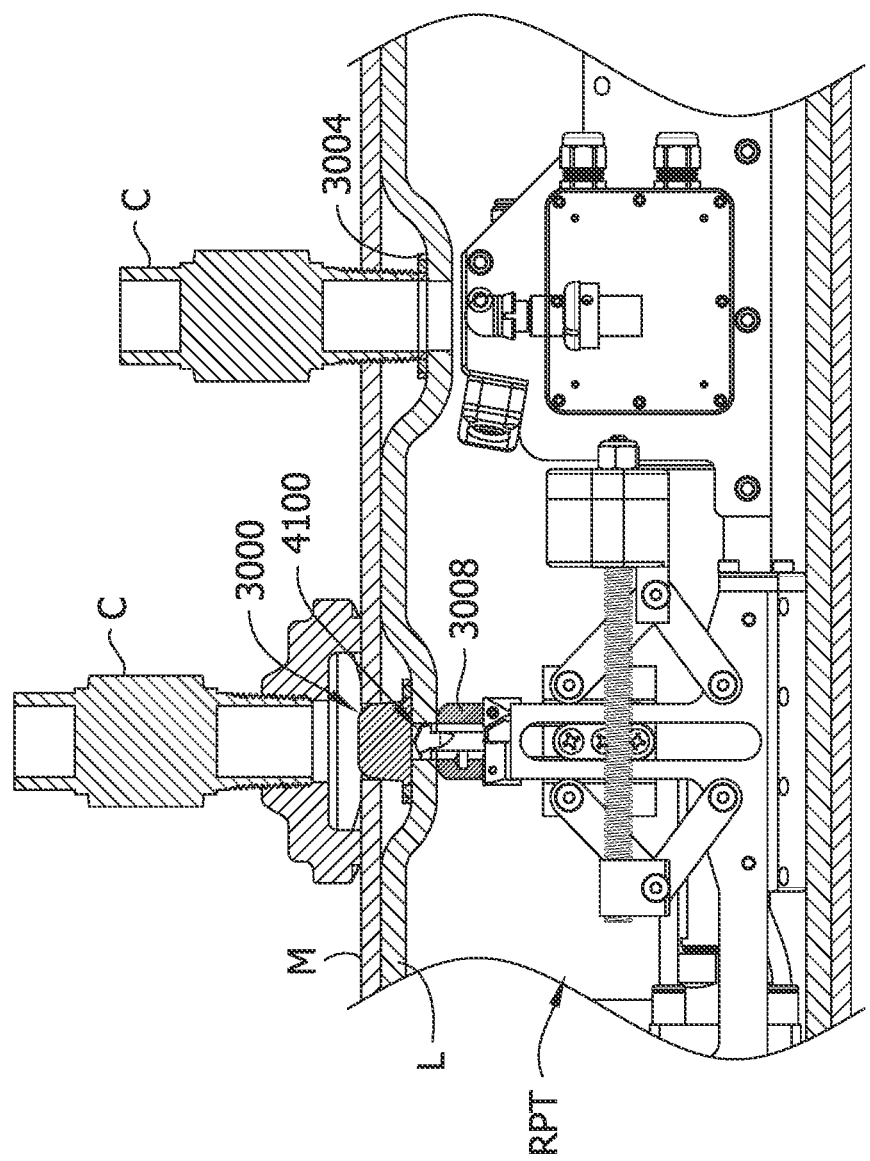
FIG. 27 is a longitudinal section, showing a robot using the bit of FIG. 15 to remove a plug in another corporation stop so that the attached removable plug section is separated from the bit by the action of the burr.
Figure 28:
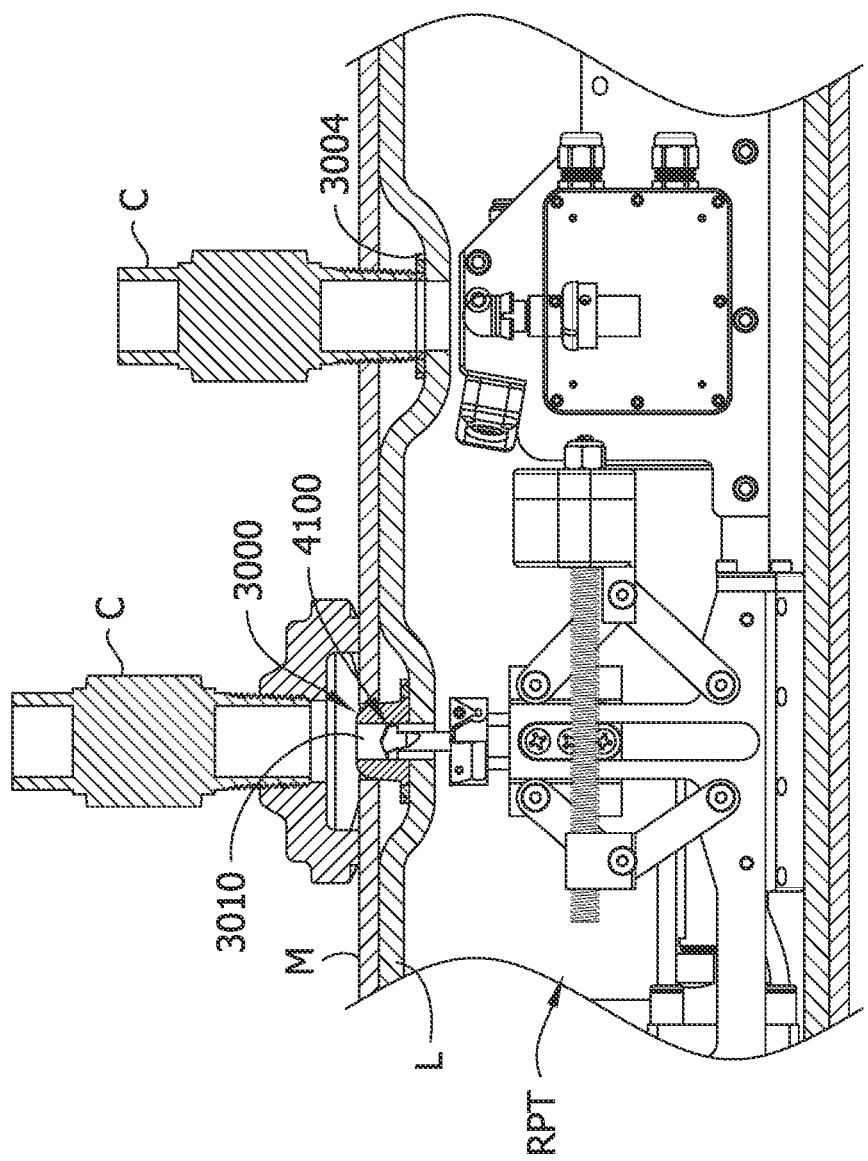
FIG. 28 is a longitudinal section similar to FIG. 27, showing the bit of FIG. 15 advanced into the other corporation stop a sufficient distance that the removable plug section that was attached to the bit has been separated from the bit.
Figure 29:
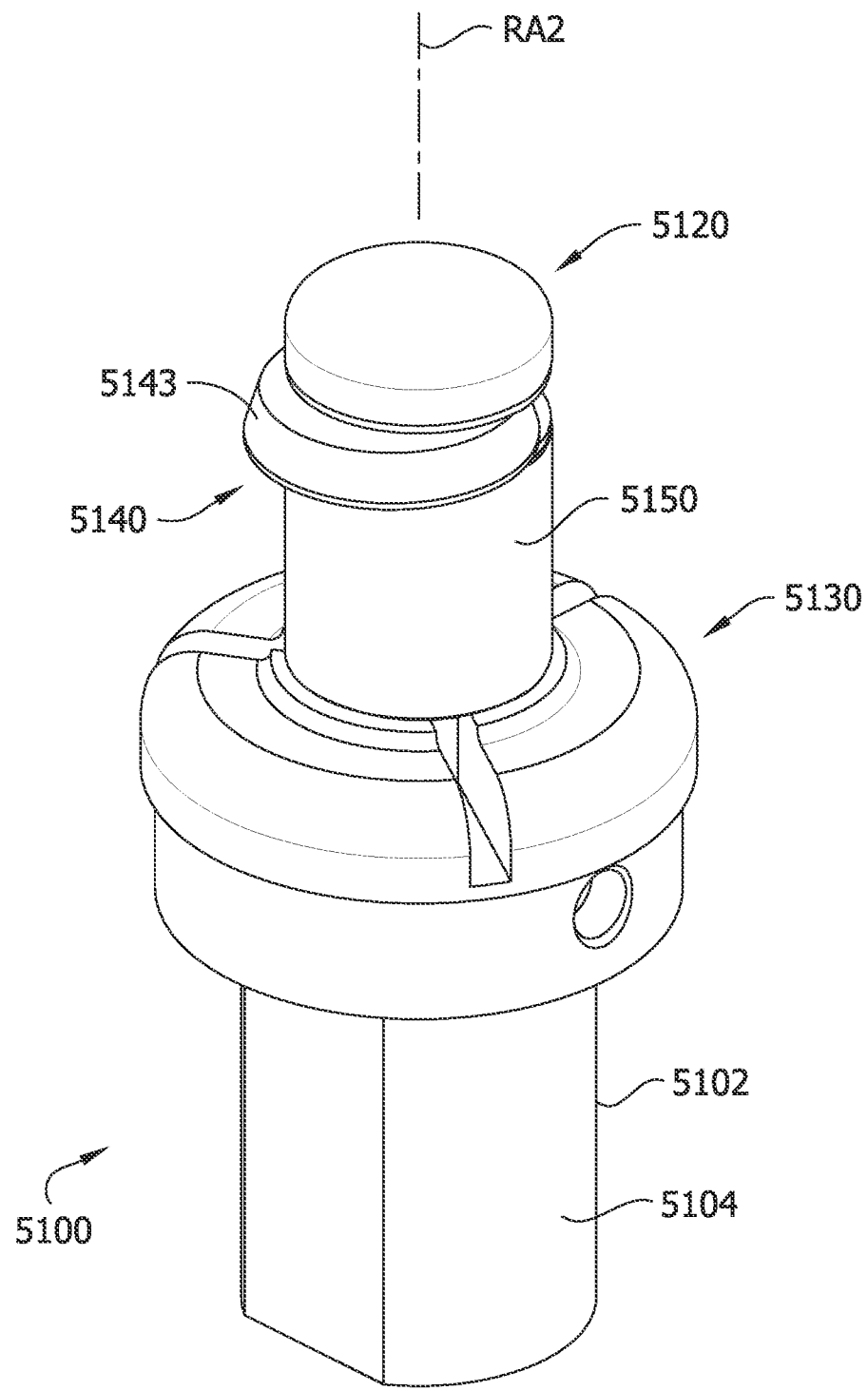
FIG. 29 is a perspective of another embodiment of a bit for removing a plug from a corporation stop.
Figure 30:
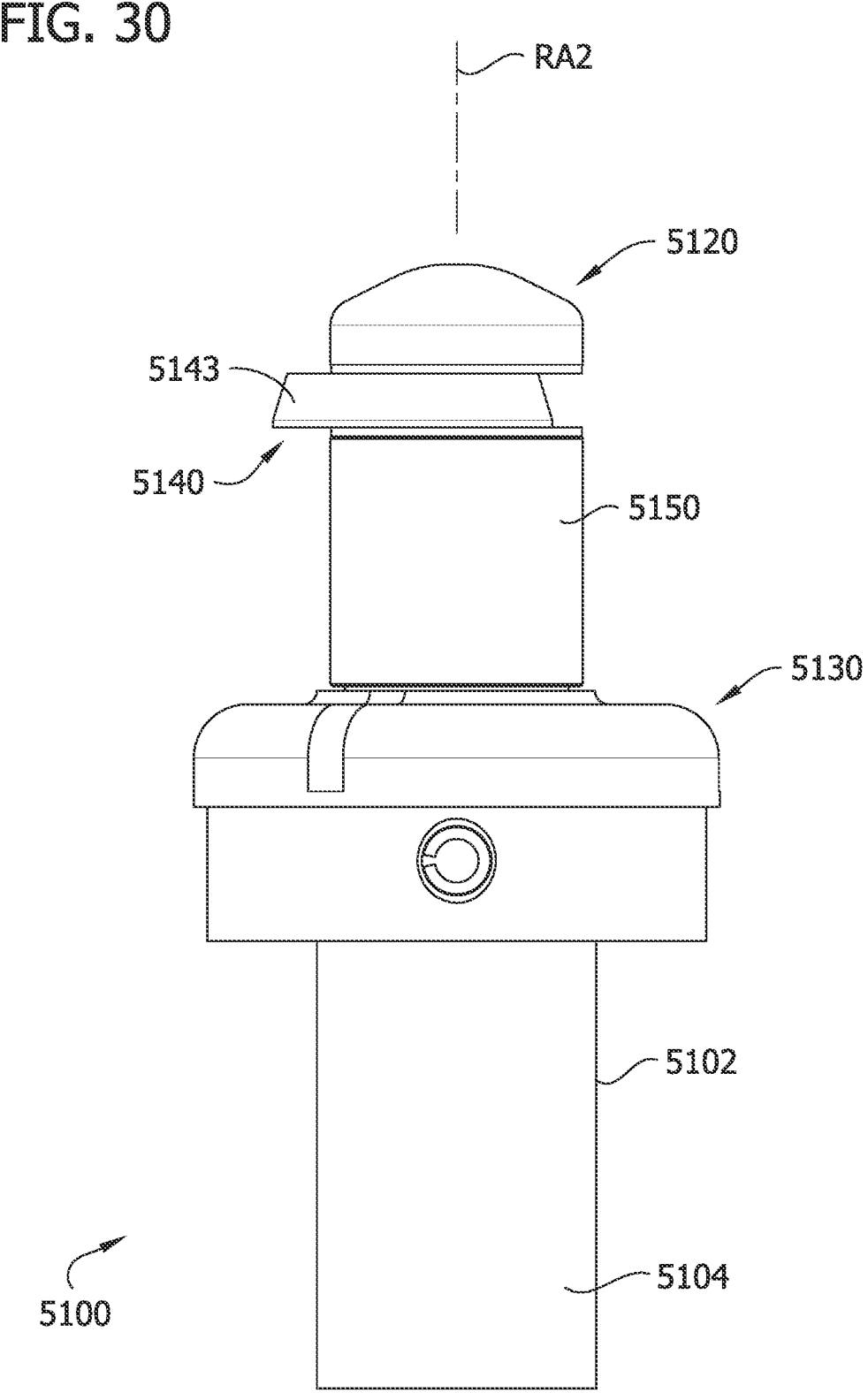
FIG. 30 is an elevation of the bit of FIG. 29.
Figure 31:
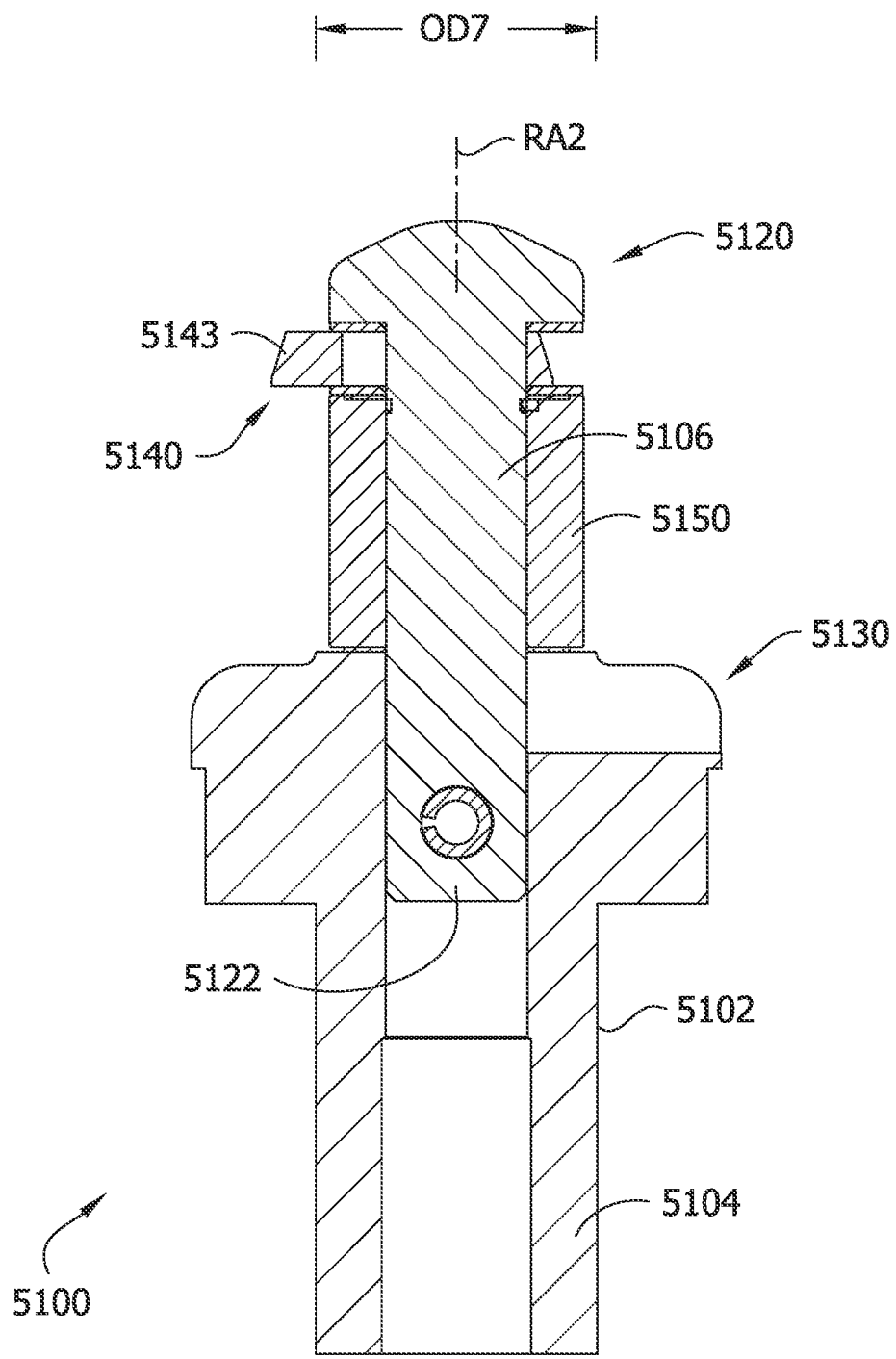
FIG. 31 is a longitudinal cross section of the bit of FIG. 29.

As shown in FIGS. 26-28, the robot adjusts the bit 4100 to dislodge the boring head 4120 from the notch 3026 and then repeats the above-described plug removal steps at each of the other corporation stops C that have been plugged and covered by the liner L. When the bit 4100 advances along a corporation stop axis CA into a subsequent corporation stop C, the removable section 3008 of the previous corporation stop initially remains attached to the bit 4100 along the stem 4122, between the burr 4130 and the boring head 4120. The attached removable section 3008 is separated from the bit 4100 by advancing the bit into the subsequent plug 3000. When this occurs, the burr 4130 advances through the attached removable section 3008 after it is pressed against the liner L. This breaks the attached removable section 3008 apart and separates it from the bit 4100 without requiring the robot to be removed from the main pipe M. Thus, the bit 4100 can be used in essentially the same manner to remove the removable section 3008 of each plug 3000 and restore fluid communication to each corporation stop C. As shown in FIG. 14 and described more fully in U.S. Patent Application Publication No. 2020/0173599, fittings F may be installed in each of the corporation stops after using the bit 4100.

Referring to FIGS. 29-33, another embodiment of a bit for removing the removable section 3008 of a plug 3000 from a corporation stop C is generally indicated at reference number 5100. The bit 5100 has a two-piece shaft 5102 configured to be coupled to a robotic drilling tool (e.g., tool RPT) for rotation about a rotational axis RA2. The shaft 5102 includes a proximal piece 5104 defining the proximal end portion of the shaft and a distal piece 5106 (FIG. 31) defining the distal end portion of the shaft. The proximal and distal shaft pieces 5104, 5106 attach to one another by a set screw or other fastener in much the same way as the shaft pieces 3104, 3106 of the bit 3100.

The bit 5100 comprises a boring head 5120 at the distal end portion of the shaft 5102 and a burr 5130 spaced apart proximally of the boring head. In the illustrated embodiment, the boring head 5120 is integrally formed with (broadly, fixedly attached to) the distal shaft piece 5106 from a single monolithic piece of material, and the burr 5130 is integrally formed with (broadly, fixedly attached to) the proximal shaft piece 5104. Each of the boring head 5120 and the burr 5130 comprises abrasive for removing material from the plug 3000. Like the boring head 3120 of the bit 3100 described above, the boring head 5120 has a diameter OD7 configured to form a pilot hole 3010 through the plug 3000 such that the pilot hole extends from the proximal end portion of the plug through the distal end portion of the plug along the axis CA. Like the burr 3130 of the bit 3100 above, the burr 5130 has a greater diameter OD8. After the boring head 5120 bores the pilot hole 3010 and clears the distal end of the plug body 3002, the burr 5130 is configured to remove an annular corner portion of the plug body 3002 that connects the durable flange section 3004 to the removable section 3008, thereby separating the removable section from the durable section so that the removable section can be removed from the corporation stop.

The bit 5100 is similar to the bit 3100 and differs from the bit 4100 in that, like the bit 3100 but unlike the bit 4100, the bit 5100 comprises a catch 5140 that is adjustable from a pass-through configuration (not shown) for passing through the pilot hole 3010 to a catching configuration (shown in FIGS. 29-33) for catching the plug. Similar to the catch 3140, the catch 5140 is supported on the shaft 5102 immediately adjacent the proximal end of the boring head 5120 by a bushing 5150 that extends along the stem 5122 between the catch and the burr 5130. Unlike the catch 3140, the catch 5140 comprises a rigid slide ring. The slide ring 5140 has a perimeter edge margin defining an outer diameter OD9 (FIG. 33) that is less than or equal to the outer diameter OD7 (FIG. 31) of the boring head 5120. The perimeter edge margin of the slide ring 5140 comprises a tapered surface 5143 that slopes radially outward as it extends axially in a distal-to-proximal direction.

Figure 32:
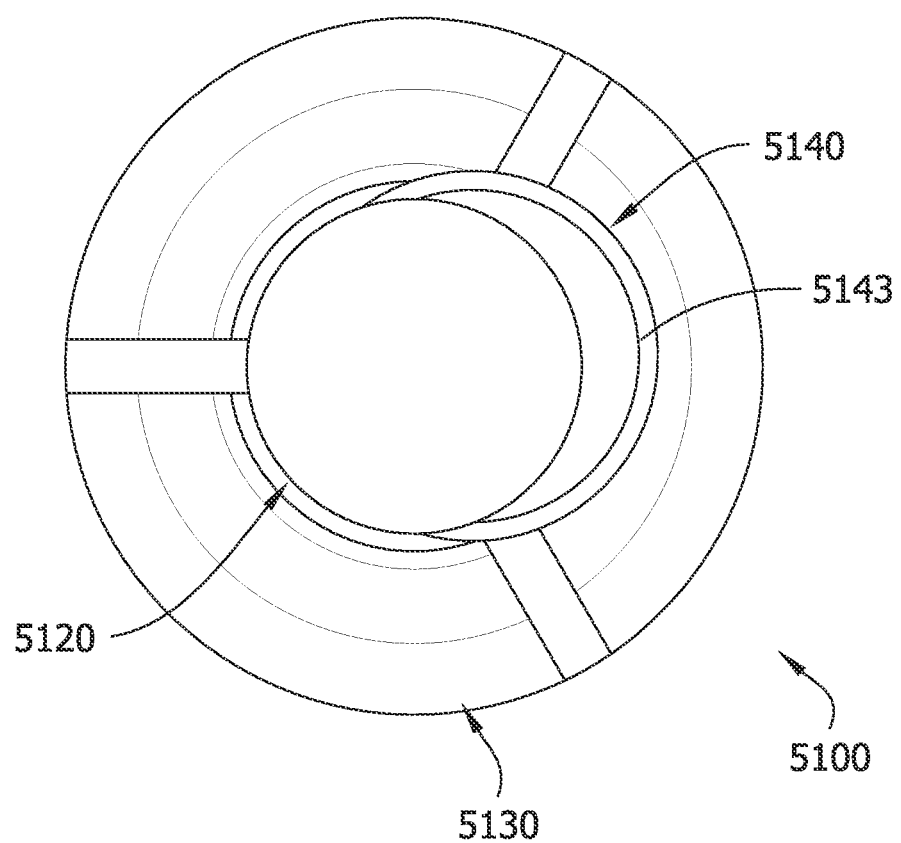
FIG. 32 is a top plan view of the bit of FIG. 29.
Figure 33:
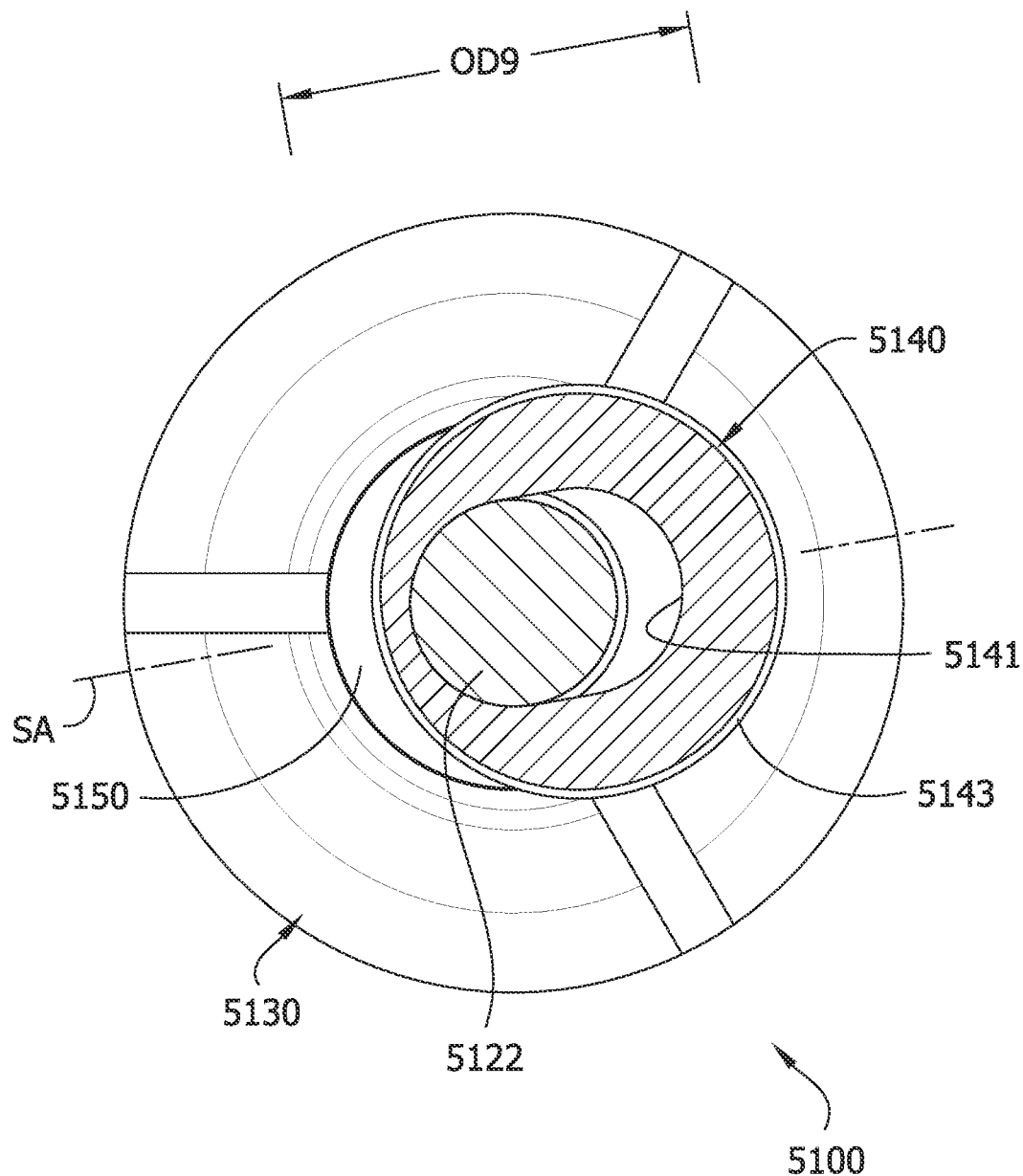
FIG. 33 is a horizontal cross section of the bit of FIG. 29.

As shown in FIG. 33, the slide ring 5140 comprises an eccentric oblong opening 5141 in which the stem 5122 of the shaft 5102 slidably received. The opening 5141 has a first end portion and a second end portion spaced apart along a slide axis SA. FIG. 33 depicts the slide ring 5140 in the catching position with the stem 5122 received in the first (outer) end portion of the opening 5141. During rotation of the drill bit 5100 about the rotational axis RA2, centripetal force will cause the slide ring 5140 to slide toward this catching position. But the slide ring 5140 is slidable from the catching position to a pass-through position in which the stem 5122 is received in the opposite second (middle) end portion of the opening 5141. In the pass through position, the slide ring 5140 is generally centered on the rotational axis RA2 such that no portion of the slide ring protrudes radially outward of the boring head 5120. By contrast, as shown in FIG. 32, in the catching position a portion of the slide ring 5140 protrudes radially with respect to the boring head 5120.

The bit 5100 can be used in essentially the same method of use as described above with respect to the bit 3100. During use, the boring head 5120 is configured to rotate about the rotational axis RA and bore a pilot hole 3010 through the plug 3000 such that the pilot hole extends from the proximal end portion of the plug through the distal end portion of the plug along the axis CA. Rotation of the bit 5100 initially causes the slide ring 5140 to move to the catching position. But when the slide ring 5140 engages the inner end of the plug 3000, the tapered surface 5143 causes the slide ring 5140 to center itself within the pilot hole 3010, thereby moving the slide ring to the pass-through position. The boring head 5120 bores through the outer end of the plug body 3002 and the burr 5130 removes the inner corner portion of the plug in essentially the same way as during use of the bit 3100 described above. When the slide ring 5140 clears the outer end of the plug body 3002 rotation of the bit 5100 causes the slide ring to slide to the catching position. In this position, the protruding portion of the slide ring 5140 overlies the distal end of the remaining removable section 3008 of the plug body 3002. Thus, when the bit 5100 moves proximally, the slide ring 5140 engages the end of the plug body 3002 and pushes the removable plug section 3008 in the proximal direction to remove the removable section of the plug from the corporation stop C. As above, a robot using the bit 5100 can remove a series plugs in individual plug removal operations without exiting the main pipe M. With each successive plug 3000, the burr 5130 will separate the removable section 3008 of the prior plug body 3002 during drilling.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the above products and methods without departing from the scope of the disclosure, it is intended that all matter contained in the above description shall be interpreted as illustrative and not in a limiting sense.

What is claimed is:

1. A bit for removing a plug from a branch conduit extending from a main pipe, the bit comprising:
    a shaft having a rotational axis and a distal end portion and a proximal end portion spaced apart from the distal end portion in a proximal direction along the rotational axis, the shaft being configured to attach to a robot capable of movement within the main pipe;
    a boring head at the distal end portion of the shaft, the boring head being configured to bore a pilot hole from a proximal end portion of the plug toward a distal end portion of the plug; and
    a catch on the shaft configured to pass through the pilot hole as the boring head bores the pilot hole, the catch being configured to engage the plug after the pilot hole is bored such that the catch can push the plug in the proximal direction when the bit is moved in the proximal direction.

2. The bit as set forth in claim 1, wherein the catch comprises a proximal shoulder of the boring head.

3. The bit as set forth in claim 1, wherein the boring head has a radially outer perimeter portion configured to bear against an inner perimeter portion of the plug from within the pilot hole to form a notch in the plug.

4. The bit as set forth in claim 3, wherein the catch is configured to engage the plug from within the notch for pushing the plug in the proximal direction when the bit is moved in the proximal direction.

5. The bit as set forth in claim 1, wherein the boring head comprises a plurality of cutting elements spaced apart about the rotational axis, each cutting element having a distal end surface and a proximal end surface spaced apart along the rotational axis, the proximal end surface of each of the plurality of cutting elements forming the catch.

6. The bit as set forth in claim 5, wherein each cutting element comprises a leading surface, a trailing surface circumferentially spaced apart from the leading surface about the rotational axis, and a radially outer perimeter surface, each of the leading surface, the trailing surface, and the radially outer perimeter surface extending axially from the proximal end surface to the distal end surface.

7. The bit as set forth in claim 6, wherein the leading surface and the radially outer perimeter surface intersect at a leading edge and form an arcuate wedge extending in a trailing direction from the leading edge.

8. The bit as set forth in claim 7, wherein each cutting element comprises a perimeter cutting tang projecting radially outward from the radially outer perimeter surface, each cutting tang including a leading tang surface oriented transverse to the radially outer perimeter surface facing in a leading circumferential direction, the leading tang surface begins spaced apart from the leading edge in the trailing circumferential direction.

9. The bit as set forth in claim 7, wherein the leading edge extends axially from the proximal surface to the distal surface and slopes in a trailing circumferential direction as it extends axially from the proximal surface to the distal surface.

10. The bit as set forth in claim 1, wherein the catch is adjustable from a pass-through position for passing through the pilot hole to a catching position for catching the plug.

11. The bit as set forth in claim 10, wherein the catch comprises one or more resiliently bendable catch arms resiliently biased to the catching position, the one or more resiliently bendable catch arms configured to be bent inward from the catching position to the pass-through position by the plug as the catch passes through the pilot hole and to resiliently rebound outward to the catching position after clearing the plug.

12. The bit as set forth in claim 10, wherein the catch comprises a slide ring slidably disposed on the shaft for movement along a slide axis with respect to the shaft from the pass-through position to the catching position, wherein in the pass-through configuration no portion of the slide ring protrudes radially outward of the boring head, and wherein in the catching position, a portion of the slide ring protrudes radially outward of the boring head.

13. The bit as set forth in claim 1, further comprising a burr on the shaft at a location spaced apart from the catch in the proximal direction.

14. The bit as set forth in claim 13, wherein the burr is configured to remove a portion of the plug after the boring head bores the pilot hole to separate a removable section of the plug from a durable section of the plug.

15. The bit as set forth in claim 14, wherein the burr comprises at least one replaceable blade.

16. The bit as set forth in claim 13, wherein the boring head has an outer dimension and the burr has an outer dimension that is greater than the outer dimension of the boring head.

17. The bit as set forth in claim 13, wherein the burr and the boring head are connected to rotate conjointly with the shaft about the rotational axis.

18. The bit as set forth in claim 16, wherein the shaft comprises a distal shaft piece and a proximal shaft piece, the boring head being fixedly attached to the distal shaft piece and the burr being fixedly attached to with the proximal shaft piece, and wherein the bit further comprises a set screw or a pin attaching the proximal shaft piece and the distal shaft piece.

19. A bit for removing a plug from a branch conduit extending from a main pipe, the bit comprising:
 a shaft having a rotational axis and a distal end portion and a proximal end portion spaced apart from the distal end portion in a proximal direction along the rotational axis, the shaft being configured to attach to a robot capable of moving within the main pipe;
 a boring head at the distal end portion of the shaft, the boring head being configured to bore a pilot hole from a proximal end portion of the plug toward a distal end portion of the plug; and
 a burr on the shaft at a location spaced apart from the boring head in the proximal direction, the burr being configured to remove a portion of the plug to separate a removable section of the plug from a durable section of the plug.

20. A method of restoring fluid communication between a main pipe and a branch conduit after the main pipe has been plugged by a plug, the method comprising:
 rotating a plug removal bit,
 advancing the plug removal bit outward along an axis of the branch conduit while rotating the plug removal bit to (i) bore a hole that extends from a proximal end portion through a distal end portion of the plug along the axis and (ii) separate a removable section of the plug that includes the pilot hole from a durable section of the plug; and
 withdrawing the plug removal bit inward along the axis of the branch conduit, whereby the plug removal bit engages the removable section of the plug and moves the removable section together with the plug removal bit to remove the removable section of the plug from the branch conduit while leaving the durable section of the plug in place.

* * * * *